US010057686B2

(12) United States Patent
Kobayashi et al.

(10) Patent No.: US 10,057,686 B2
(45) Date of Patent: Aug. 21, 2018

(54) LOUDSPEAKER, ELECTRONIC APPARATUS USING LOUDSPEAKER, AND MOBILE BODY DEVICE

(71) Applicant: Panasonic Intellectual Property Management Co., Ltd., Osaka (JP)

(72) Inventors: Yuichi Kobayashi, Okayama (JP); Masahiko Miyazaki, Okayama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/503,848

(22) PCT Filed: Dec. 3, 2015

(86) PCT No.: PCT/JP2015/006006
§ 371 (c)(1),
(2) Date: Feb. 14, 2017

(87) PCT Pub. No.: WO2016/092782
PCT Pub. Date: Jun. 16, 2016

(65) Prior Publication Data

US 2017/0280247 A1 Sep. 28, 2017

(30) Foreign Application Priority Data

Dec. 12, 2014 (JP) ................................ 2014-251640

(51) Int. Cl.
*H04B 1/00* (2006.01)
*H04R 9/06* (2006.01)
(Continued)

(52) U.S. Cl.
CPC ................ *H04R 9/06* (2013.01); *H04R 7/12* (2013.01); *H04R 7/18* (2013.01); *H04R 9/025* (2013.01);
(Continued)

(58) Field of Classification Search
CPC .......... H04R 9/06; H04R 9/063; H04R 9/066; H04R 9/00; H04R 9/02; H04R 9/025;
(Continued)

(56) References Cited

U.S. PATENT DOCUMENTS 4,320,263 A * 3/1982 Thiele .................... H04R 9/027 381/415
4,357,498 A * 11/1982 Tsuchiya ................ H04R 9/063 181/165
(Continued)

FOREIGN PATENT DOCUMENTS

JP 59-152797 8/1984
JP 2008-312056 12/2008
(Continued)

OTHER PUBLICATIONS

International Search Report of PCT application No. PCT/JP2015/006006 dated Mar. 1, 2016.

*Primary Examiner* — Leshui Zhang
(74) *Attorney, Agent, or Firm* — McDermott Will & Emery LLP

(57) ABSTRACT

A loudspeaker includes a bottom plate, an internal magnet, an internal plate, an external magnetic part, a frame, a diaphragm, and a voice coil. The internal plate includes a cutout portion so that the internal plate is smaller than the internal magnet when viewed from the top surface of the internal plate. Between the voice coil and the internal plate, there are a holding portion holding magnetic fluid and a void part having a void. The magnetic fluid is held in part of the cutout portion.

23 Claims, 17 Drawing Sheets

(51) Int. Cl.
*H04R 7/18* (2006.01)
*H04R 7/12* (2006.01)
*H04R 9/02* (2006.01)

(52) U.S. Cl.
CPC .... *H04R 2201/028* (2013.01); *H04R 2499/13* (2013.01)

(58) Field of Classification Search
CPC .......... H04R 9/027; H04R 9/04; H04R 9/045; H04R 9/046; H04R 9/047; H04R 7/12; H04R 7/122; H04R 7/125; H04R 7/127; H04R 7/16; H04R 7/18; H04R 7/24; H04R 7/26; H04R 2499/11; H04R 2201/02; H04R 2201/021; H04R 2201/025; H04R 2201/028; H04R 2201/029; H04R 2499/10; H04R 2499/13; H04R 2499/15; H04R 2209/022; H04R 31/006; H04M 1/03
USPC ... 381/86, 87, 332, 333, 334, 335, 150, 337, 381/339, 345, 349, 351, 165, 167, 184, 381/185, 385, 386, 388, 389, 395, 400, 381/401, 403, 404, 405, 406, 407, 408, 381/412, 414, 420, 421, 422, 433
See application file for complete search history.

(56) References Cited

U.S. PATENT DOCUMENTS

| | | | | |
|---|---|---|---|---|
| 2007/0147649 | A1* | 6/2007 | Takase | H04R 1/023 381/396 |
| 2008/0309440 | A1* | 12/2008 | Itakura | H01F 7/066 335/231 |
| 2014/0079258 | A1 | 3/2014 | Fujise et al. | |
| 2015/0016660 | A1 | 1/2015 | Matsumura et al. | |

FOREIGN PATENT DOCUMENTS

| | | | | |
|---|---|---|---|---|
| JP | 2009171279 A * | 7/2009 | | H04R 9/02 |
| JP | 2010-258856 | 11/2010 | | |
| WO | 2013/114872 | 8/2013 | | |
| WO | 2014/097632 | 6/2014 | | |

* cited by examiner

LOUDSPEAKER, ELECTRONIC APPARATUS USING LOUDSPEAKER, AND MOBILE BODY DEVICE

CROSS-REFERENCE TO RELATED APPLICATIONS

This application is a U.S. national stage application of the PCT International Application No. PCT/JP2015/006006 filed on Dec. 3, 2015, which claims the benefit of foreign priority of Japanese patent application 2014-251640 filed on Dec. 12, 2014, the contents all of which are incorporated herein by reference.

TECHNICAL FIELD

The present disclosure relates to a loudspeaker that can be mounted in various electronic apparatuses, and an electronic apparatus and a mobile body device each including such a loudspeaker.

BACKGROUND ART

Conventional loudspeakers typically include a frame, a magnetic circuit having a magnetic gap, a voice coil, a diaphragm, and a center pole. The magnetic circuit includes a yoke, a ring magnet, an annular top plate, and magnetic fluid. The center pole is a columnar projection extending from the center of the yoke.

The magnetic circuit is stored in and coupled to the frame. The outer periphery of the diaphragm is coupled to the frame. The magnet is coupled to the yoke. The top plate is coupled onto the magnet. The center pole penetrates the centers of the magnet and the top plate. The magnetic gap is located between the side surface of the center pole and the inner circumferential surface of the top plate. One end of the voice coil is coupled to the diaphragm and the other end is inserted in the magnetic gap.

In the above configuration, the magnetic fluid is injected between the voice coil and the center pole and also between the voice coil and the top plate.

One example of techniques related to the present application is Patent Literature 1.

CITATION LIST

Patent Literature

PTL 1: Japanese Unexamined Patent Application Publication No. S59-152797

SUMMARY OF THE INVENTION

The loudspeaker in accordance with the present disclosure includes a bottom plate, an internal magnet, an internal plate, an external magnetic part (first external magnetic part), a frame, a diaphragm, and a voice coil.

The internal magnet has a first surface, which is coupled to the bottom plate.

The internal plate is coupled to a second surface of the internal magnet on the reverse side from the first surface.

The first external magnetic part is coupled to the bottom plate with the internal plate and a first magnetic gap located therebetween.

The frame is coupled to at least one of the bottom plate and the first external magnetic part.

The diaphragm has an outer peripheral edge, which is supported by the frame.

The voice coil, which is cylindrical, has a first end and a second end opposite to the first end. The first end is coupled to the diaphragm, and the second end is inserted in the first magnetic gap.

The internal plate includes a cutout portion where the internal plate has an outer periphery, which is smaller than the outer periphery of the internal magnet when viewed from the top surface of the internal plate.

Between the voice coil and the internal plate, there are a holding portion holding magnetic fluid and a void part having a void. The holding portion and the void part are adjacent to each other.

The magnetic fluid is held in part of the cutout portion.

DESCRIPTION OF EMBODIMENTS

In the conventional loudspeaker, the vibration of the diaphragm causes the air in the space surrounded by the diaphragm, the voice coil, and the center pole to flow out or into the space from outside loudspeaker. Therefore, if the voice coil has a large amplitude, the air flowing in and out is likely to scatter the magnetic fluid. The scattering of the magnetic fluid may also be caused when the loudspeaker is accidentally dropped and subjected to an impact force.

The following is a description of the loudspeaker in accordance with the present exemplary embodiment, and an electronic apparatus mounted with the loudspeaker. Prior to describing the loudspeaker, the electronic apparatus will be described as follows. The electronic apparatus, which is mounted with the loudspeaker, is a stationary type such as video devices like TVs and audio devices like mini-components. Since the electronic apparatuses of this type are placed in households, it rarely occurs that the magnetic fluid is subjected to an impact. Therefore, stationary electronic apparatuses are designed primarily to reduce the scattering of the magnetic fluid due to the vibration of the voice coil.

Conventional loudspeakers used as tweeters for the high-frequency sound range is necessary to reduce the input of low-frequency signals. In other words, it is necessary to reduce the scattering of the magnetic fluid by decreasing the amplitude of the voice coil. Meanwhile, in loudspeakers capable of reproducing the entire range, such as full range and woofer loudspeakers, the voice coil has a large amplitude when receiving low frequency sound waves. Therefore, these loudspeakers are designed to reduce the scattering of the magnetic fluid caused by the amplitude of the voice coil.

In the meantime, there is a growing popularity of portable electronic apparatuses such as mobile telephones, smartphones, portable game consoles, and portable navigation devices, which are expected to be small and light.

With the recent popularity of internet delivery, there have been increasing opportunities for the users to watch movies, TV programs, and other moving images on portable electronic apparatuses. Therefore, these devices are expected to reproduce powerful sounds.

Thus, in spite of their smallness, loudspeakers mounted in portable electronic apparatuses are expected to have features, such as high input power resistance to reproduce high sound-pressure-level sound and a wide reproduction frequency range to reproduce low-frequency sound. Hence, loudspeakers mounted in portable electronic apparatuses are expected to reduce the scattering of the magnetic fluid, which is possibly caused by the large amplitude of the voice coil or by an impact when the electronic apparatus is accidentally dropped.

Exemplary Embodiment

Figure 1:
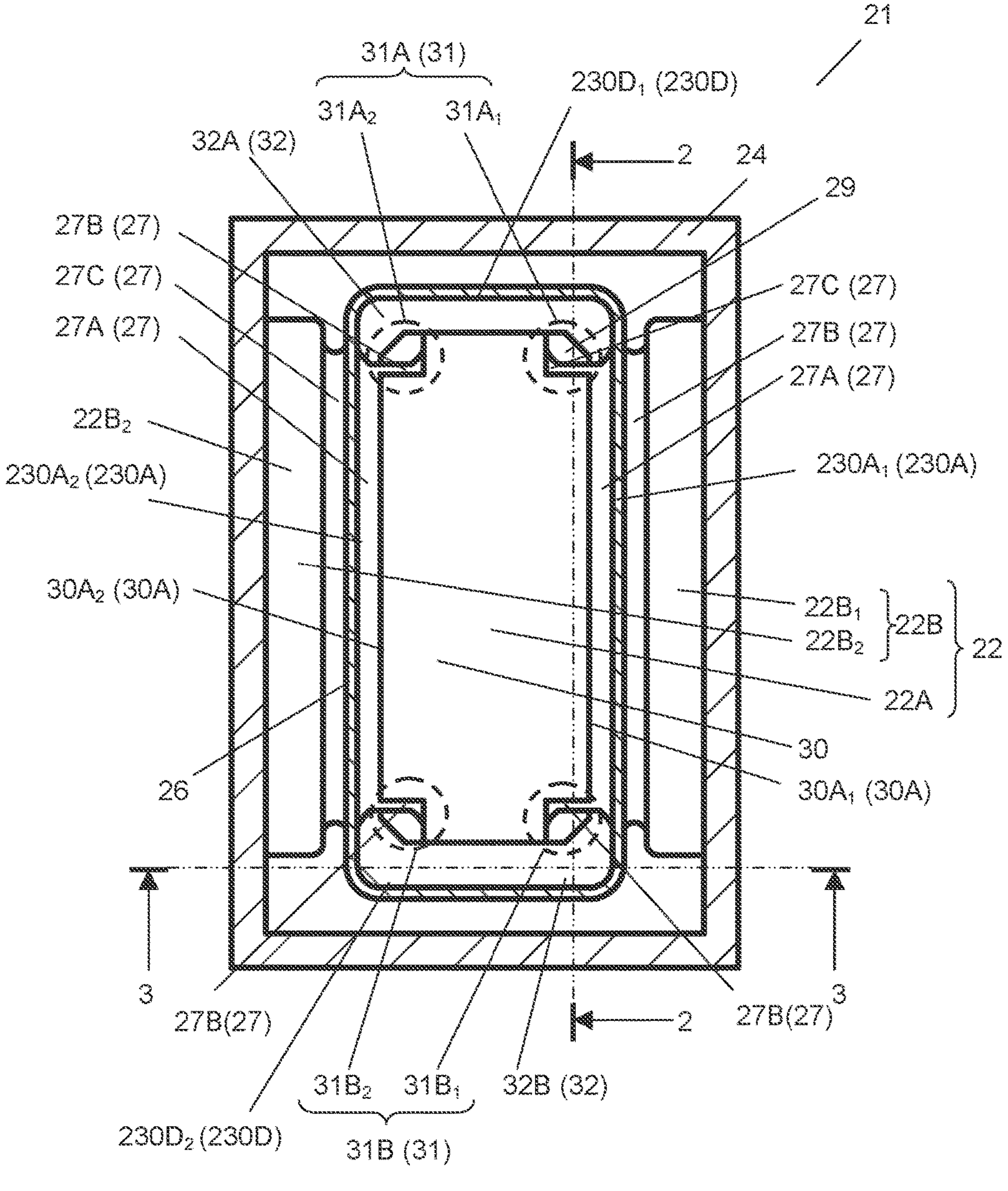
FIG. 1 is a top sectional view of a loudspeaker in accordance with a present exemplary embodiment.
Figure 2:
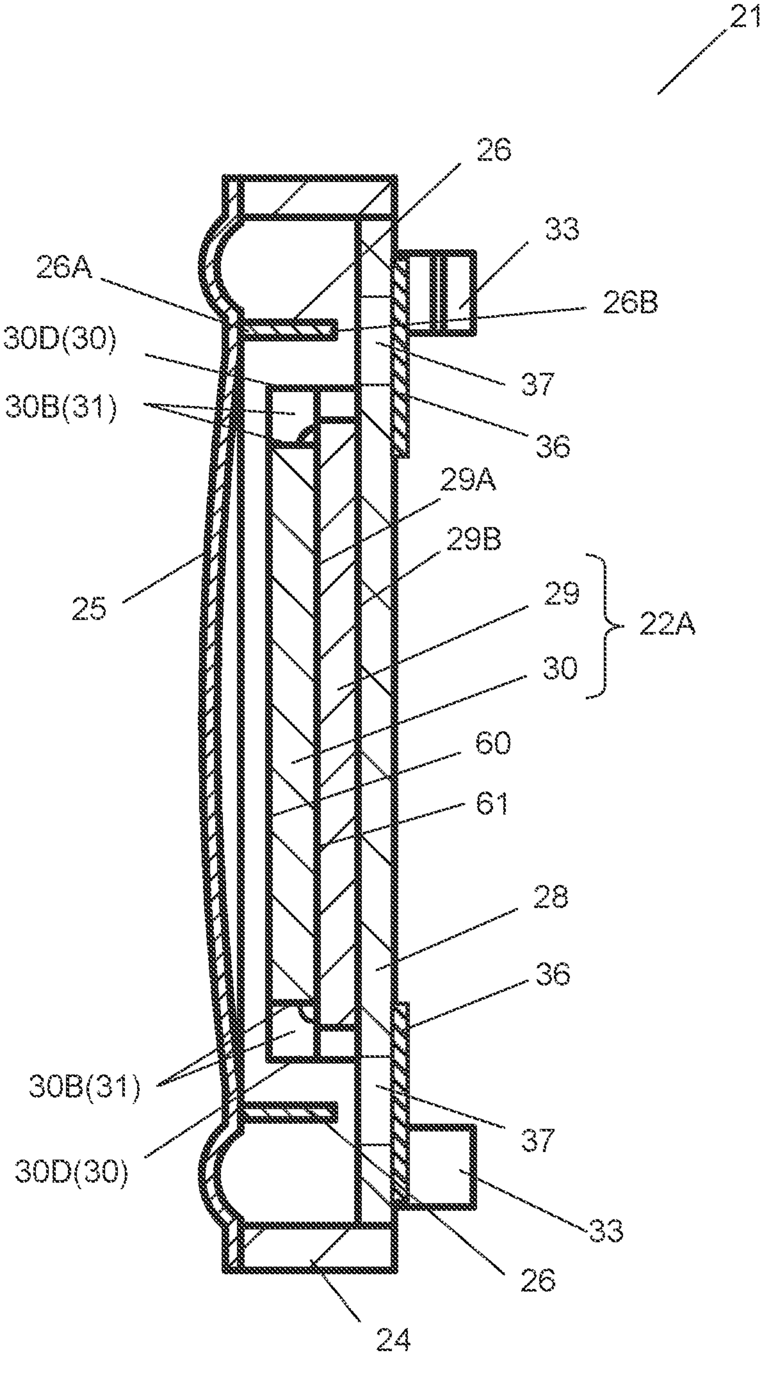
FIG. 2 is a sectional view taken along line 2-2 of FIG. 1.
Figure 3:
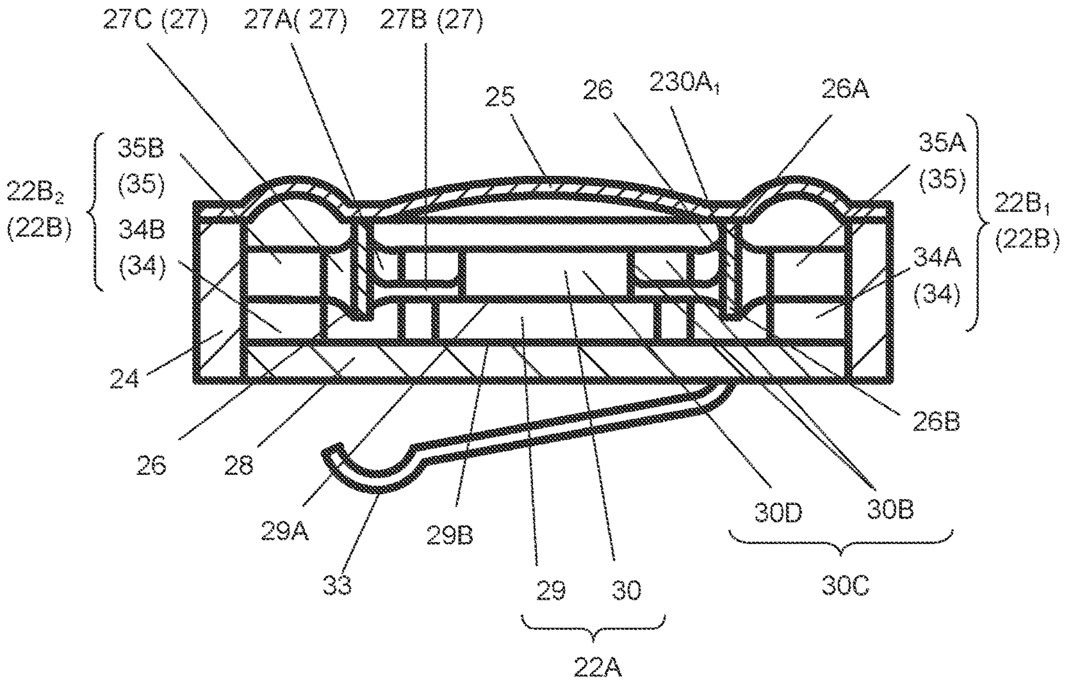
FIG. 3 is a sectional view taken along line 3-3 of FIG. 1.
Figure 4:
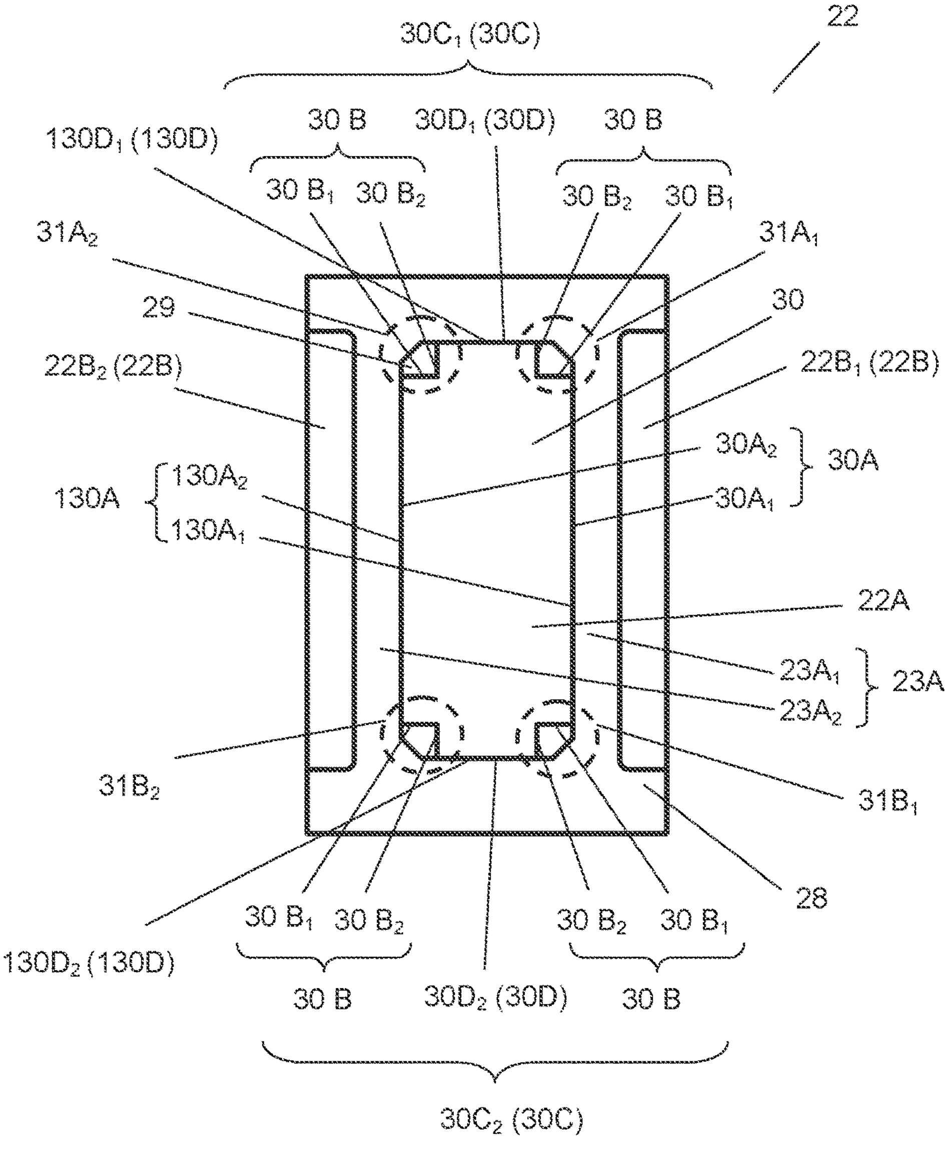
FIG. 4 is a top view of a magnetic circuit in the present exemplary embodiment.

Loudspeaker 21 in accordance with the present exemplary embodiment will now be described with reference to drawings. FIG. 1 is a top sectional view of loudspeaker 21 in accordance with the present exemplary embodiment. FIG. 2 is a sectional view taken along line 2-2 of FIG. 1 or along the long side of loudspeaker 21. FIG. 3 is a sectional view taken along line 3-3 of FIG. 1 or along the short side of loudspeaker 21. FIG. 4 is a top view of magnetic circuit 22 in the present exemplary embodiment.

The loudspeaker 21 in accordance with the present disclosure includes bottom plate 28, internal magnet 29, internal plate 30, external magnetic parts 22B (including a first external magnetic part), frame 24, diaphragm 25, and voice coil 26.

Internal magnet 29 has a first surface, which is coupled to bottom plate 28.

Internal plate 30 is coupled to a second surface, which is on the reverse side from the first surface of internal magnet 29.

External magnetic parts 22B are coupled to bottom plate 28 with internal plate 30 and magnetic gaps 23A (including a first magnetic gap) located between them.

Frame 24 is coupled to at least one of bottom plate 28 and external magnetic parts 22B.

The outer peripheral edge of diaphragm 25 is supported by frame 24.

Cylindrical voice coil 26 has first end 26A, which is coupled to diaphragm 25 and also has second end 26B, which is opposite to first end 26A and is inserted in magnetic gaps 23A.

Internal plate 30 has cutout portions 31. The outer periphery of internal plate 30 in cutout portions 31 is smaller than that of internal magnet 29 when viewed from the top surface of internal plate 30.

Between voice coil 26 and internal plate 30, there are located holding portions 27A, 27B, and 27C filled with magnetic fluid 27, and void parts 32 with a void. Holding portions 27A, 27B, and 27C are adjacent to void parts 32.

Magnetic fluid 27 is held in part of each of cutout portions 31.

Loudspeaker 21 in accordance with the present disclosure will now be described in detail. Loudspeaker 21 includes magnetic circuit 22, frame 24, diaphragm 25, voice coil 26, and magnetic fluid 27. Magnetic circuit 22 has magnetic gaps 23A. Magnetic fluid 27 is held in holding portions 27A, 27B, and 27C. Holding portions 27B will also be referred to as the trap portions. Magnetic circuit 22 includes bottom plate 28, internal magnetic part 22A, and external magnetic parts 22B. Internal magnetic part 22A includes internal magnet 29 and internal plate 30. Internal magnet 29 includes magnetic poles 29A and 29B, which are opposite in polarity.

Internal plate 30 includes top surface 60, bottom surface 61, side surfaces 30A, and side surfaces 30C. Top surface 60 is opposite to bottom surface 61 (FIG. 2). Side surfaces 30A are the long sides of internal plate 30 when viewed from above (FIGS. 1 and 4). Side surfaces 30A are a collective term of side surface $30A_1$ and side surface $30A_2$. Cutout portions 31, which are a collective term of cutout portions 31A and cutout portions 31B, are located at the four corners of internal plate 30. Cutout portions 31A are a collective term of cutout portion $31A_1$ and cutout portion $31A_2$. Cutout portions 31B are a collective term of cutout portion $31B_1$ and cutout portion $31B_2$.

Side surfaces 30C have side surfaces 30B and side surfaces 30D (FIG. 4). Side surfaces 30B are a collective term of side surfaces $30B_1$ and side surfaces $30B_2$. Side surfaces 30B are located inside the outer peripheral edge of internal magnet 29 when internal plate 30 is viewed from top surface 60. Cutout portions 31 are located adjacent to the ends of side surfaces 30A, and penetrate from the top surface to the bottom surface of internal plate 30. Side surfaces 30D and side surfaces 30A are adjacent to each other with cutout portions 31 located between them. Bottom surface 61 of internal plate 30 is coupled to magnetic pole 29A.

External magnetic parts 22B face at least part of each of side surfaces 30A with magnetic gaps 23A (FIG. 4) located between them. Cylindrical voice coil 26 has first end 26A and second end 26B opposite to each other (FIGS. 2 and 3). First end 26A is coupled to diaphragm 25, and second end 26B is inserted in magnetic gaps 23A. Of the inner side surfaces of voice coil 26, some portions (side surfaces 230A) face side surfaces 30A, and other portions (side surfaces 230D) face side surfaces 30C with the voids located therebetween. Side surfaces 230A, which are a collective term of side surface 230$A_1$ and side surface 230$A_2$, correspond to the portions of voice coil 26 that face side surfaces 30A. Side surfaces 230D, which are a collective term of side surface 230$D_1$ and side surface 230$D_2$, correspond to the portions of voice coil 26 that face side surfaces 30C. The above-mentioned portions with a void are referred to as void parts 32. Void parts 32 are a collective term of void part 32A and void part 32B. Frame 24 is coupled to at least one of bottom plate 28 and external magnetic parts 22B.

The outer peripheral edge of diaphragm 25 is supported by frame 24 (FIGS. 2 and 3). Bottom plate 28 is coupled to magnetic pole 29B and external magnetic parts 22B. Holding portions 27A are located between side surfaces 30A and the inner side surfaces of voice coil 26 (FIG. 1).

Cutout portions 31A are located on the boundary between void parts 32 and holding portions 27A. Since side surfaces 30B are located inside the outer peripheral edge of internal magnet 29, magnetic fluid 27 is attracted and held in part of each of cutout portions 31A and 31B by the magnetic force of internal magnet 29 in cutout portions 31A and 31B. As a result, cutout portions 31A and 31B have holding portions 27B (trap portions) in which magnetic fluid 27 is held. The magnetic force of internal magnet 29 keeps the magnetic fluid within holding portions 27B, for example, when loudspeaker 21 is dropped and subjected to an impact force. This reduces the scattering of the magnetic fluid.

The vibration of diaphragm 25 can increase or decrease the volume of the space defined by diaphragm 25, voice coil 26, and internal magnetic part 22A. When diaphragm 25 vibrates in the direction of decreasing the volume of the space, the air in the space flows out through the passage extending between internal magnetic part 22A and the inner side surfaces of voice coil 26. Meanwhile, when diaphragm 25 vibrates in the direction of increasing the volume of the space, the air outside loudspeaker 21 flows into the space though the passage. In this situation, magnetic fluid 27 is likely to scatter in the vicinity of the boundary between holding portions 27A and void part 32A. However, in the configuration in accordance with the present disclosure, the magnetic force of internal magnet 29 in cutout portions 31A keeps magnetic fluid 27 within cutout portion 31$A_1$. This configuration reduces magnetic fluid 27 from infiltrating void parts 32, and also reduces a decrease in the passage sectional area, and hence, an increase in the speed of the air flowing through the passage. As a result, the magnetic fluid is less scattered.

In the present exemplary embodiment, the magnetic fluid is less scattered, and hence, less reduced in amount. As a result, the magnetic flux density in magnetic gaps 23A can be maintained using small-sized internal magnet 29 with a small magnetic force. Thus, loudspeaker 21 has high input power resistance, a wide reproduction frequency range, and other excellent characteristic in spite of its smallness. The input power resistance is also increased because loudspeaker 21 prevents the temperature rise of the voice coil. As a result, loudspeaker 21 has better sound pressure characteristics.

Loudspeaker 21 will now be described in more detail. Loudspeaker 21 preferably includes terminals 33 (FIGS. 2 and 3). Terminals 33 are coupled to frame 24 by, for example, insert molding, and are electrically connected to voice coil 26. Terminals 33 receive audio signals, enabling voice coil 26 to vibrate.

Magnetic fluid 27 will now be described as follows. Fluid 27 should have as high a saturation magnetic flux density as possible so that it can be easily attracted into magnetic gaps 23A by the attractive force of internal magnet 29. This further reduces the scattering of fluid 27. The saturation magnetic flux density of fluid 27 is preferably in the range of 20 mT to 200 mT, inclusive. When it exceeds 200 mT, fluid 27 contains a large amount of magnetic powder and prevents voice coil 26 from vibrating. When it is less than 20 mT, the magnetic attractive force is low, making fluid 27 more likely to scatter. Using fluid 27 with a saturation magnetic flux density in the range of 20 mT to 200 mT, inclusive provides loudspeaker 21 with excellent sound pressure-frequency response.

It is preferable that fluid 27 should have as low a surface tension as possible on the inner side surfaces of voice coil 26 so as to be more wettable to voice coil 26. This increases the area of holding portions 27A in which fluid 27 and voice coil 26 come into contact with each other. As a result, fluid 27 is less scattered.

The clearances between voice coil 26 and internal magnetic part 22A and between second end 26B of voice coil 26 and bottom plate 28 are very small. If having a small surface tension on the inner side surfaces of voice coil 26, fluid 27 may infiltrate these clearances due to the capillary phenomenon. To avoid this happening, it is preferable that a coating agent or adhesive (not shown) should be applied to second end 26B of voice coil 26 excluding side surfaces 230A. The coating agent or adhesive is preferably applied also to the following regions: the side surfaces of internal magnet 29; the top surface of bottom plate 28; the region between internal magnet 29 and internal plate 30; and the top surface of internal plate 30. This configuration prevents fluid 27 from infiltrating small clearances other than holding portions 27A and from flowing onto the top surface of internal plate 30. Examples of the coating agent and adhesive include fluorine-based material. Fluorine-based coating agents and adhesives repel fluid 27 and prevent its flowing out.

If fluid 27 reaches the joint between voice coil 26 and diaphragm 25, fluid 27 may spread further along the joint of voice coil 26 and diaphragm 25 due to the capillary phenomenon. To avoid this happening, the coating agent or adhesive is preferably applied to first end 26A of voice coil 26 excluding side surfaces 230A so that fluid 27 can be prevented from reaching the joint between voice coil 26 and diaphragm 25.

If voice coil 26 is substantially square-shaped when viewed from above, fluid 27 that has reached the four corners of voice coil 26 may creep up the four corners due to the capillary phenomenon and may reach the joint between voice coil 26 and diaphragm 25. In this situation, too, fluid 27 may spread further along the joint between voice coil 26 and diaphragm 25. To prevent fluid 27 from reaching the four corners of voice coil 26, it is preferable that the corners should be coated with the coating agent or adhesive.

The coating agent or adhesive may be applied to surround side surfaces 230A of voice coil 26 instead of being applied to the entire region of voice coil 26 excluding side surfaces 230A.

Magnetic circuit 22 will now be described in detail. External magnetic parts 22B face side surfaces 30A with magnetic gaps 23A located between them. In FIG. 4, when magnetic circuit 22 is viewed from above, side surface 30$A_1$ is the right side surface of internal plate 30, and side surface 30$A_2$ is the left side surface. The external magnetic part facing side surface 30$A_1$ with magnetic gap 23$A_1$ located between them is referred to as external magnetic part 22$B_1$. The external magnetic part facing side surface 30$A_2$ with magnetic gap 23$A_2$ located between them is referred to as external magnetic part 22$B_2$. Side surface 30$A_1$ and side surface 30$A_2$ may be collectively referred to as side surfaces 30A. Magnetic gaps 23$A_1$ and 23$A_2$ may be collectively referred to as magnetic gaps 23A. External magnetic part 22$B_1$ and external magnetic part 22$B_2$ may be collectively referred to as external magnetic parts 22B.

In other words, internal magnet 29 has side surface 130$A_1$ (first side surface) and side surface 130$A_2$ (second side surface), which is opposite to and substantially parallel to side surface 130$A_1$. Internal plate 30 has side surface 30$A_1$ (third side surface) substantially parallel to side surface 130$A_1$ and side surface 30$A_2$ (fourth side surface) substantially parallel to side surface 130$A_2$. External magnetic part 22$B_1$ (first external magnetic part) faces side surface 30$A_1$ with magnetic gap 23$A_1$ (first magnetic gap) located between them. External magnetic part 22$B_2$ (second external magnetic part) faces side surface 30$A_2$ with magnetic gap 23$A_2$ (second magnetic gap) located between them. Side surface 130$A_1$ and side surface 130$A_2$ may be collectively referred to as side surfaces 130A.

Internal magnet 29 further has side surface 130$D_1$ (fifth side surface) substantially perpendicular to side surface 130$A_1$ and side surface 130$D_2$ (sixth side surface) which is opposite to and substantially parallel to side surface 130$D_1$. Internal plate 30 has side surface 30$D_1$ (seventh side surface) substantially parallel to side surface 130$D_1$ and side surface 30$D_2$ (eighth side surface) substantially parallel to side surface 130$D_2$. Side surface 130$D_1$ and side surface 130$D_2$ may be collectively referred to as side surfaces 130D.

It is preferable that external magnetic parts 22B should face the entire part of side surfaces 30A, but may alternatively face only part of side surfaces 30A. This configuration increases the magnetic force of magnetic gaps 23A. As shown in FIG. 1, it is preferable that the magnetic fluid should be held between the outer surface of voice coil 26 and external magnetic parts 22B. In other words, it is preferable that holding portions 27C should be provided also between the outer surface of voice coil 26 and external magnetic parts 22B. This configuration increases the magnetic flux density in magnetic gaps 23A.

As shown in FIG. 3, it is preferable that external magnetic parts 22B should include external magnets 34 and external plates 35. In other word, it is preferable that external magnetic part 22$B_1$ should include external magnet 34A (first external magnet) and external plate 35A (first external plate), and that external magnetic part 22$B_2$ should include external magnet 34B (second external magnet) and external plate 35B (second external plate). External magnet 34A and external magnet 34B may be collectively referred to as external magnets 34. External plate 35A and external plate 35B may be collectively referred to as external plates 35. External magnets 34 are magnetically coupled in series with internal magnet 29 with bottom plate 28 located between them. Internal magnet 29 is magnetized in the opposite direction to external magnets 34. In this case, external magnets 34 are coupled to the upper part of bottom plate 28, and external plates 35 are coupled to the upper part of external magnets 34. The side surfaces of internal plate 30 and the side surfaces of external plates 35 face each other, and magnetic gaps 23A are located between them. This configuration increases the magnetic flux density in magnetic gaps 23A, providing loudspeaker 21 with excellent sound pressure characteristics.

Internal plate 30, external plates 35, and bottom plate 28, which are made of magnetic material, preferably have a low magnetoresistance and a high saturation magnetic flux density. Hence, it is preferable that these components should be made of permendur. This configuration increases the magnetic flux density in magnetic gaps 23A, and allows fluid 27 to be held in magnetic gaps 23A with a higher magnetic attractive force. As a result, fluid 27 is less scattered.

As shown in FIG. 2, it is preferable that magnetic pole 29A should be exposed in cutout portions 31. In this configuration, cutout portions 31 function as stepped portions in internal magnetic part 22A, thereby preventing fluid 27 from flowing onto the top surface of internal plate 30. In cutout portions 31, magnetic pole 29A is not necessarily exposed. In other words, in cutout portions 31, it does not matter if part or all of magnetic pole 29A is covered with non-magnetic material. Internal magnet 29 and internal plate 30 are coupled together with an adhesive. In cutout portions 31, it does not matter if part or all of magnetic pole 29A is coated with an adhesive or other resin. This configuration reduces the occurrence of clearance between internal magnet 29 and internal plate 30 in cutout portions 31, and hence reduces the infiltration of fluid 27 into between internal magnet 29 and internal plate 30.

The magnetic flux of internal magnet 29 is once directed to the air in the region where cutout portions 31 and internal magnet 29 overlap with each other. In general, magnetic fluxes flow from high magnetoresistance to low magnetoresistance. Therefore, the magnetic flux once directed to the air from internal magnet 29 flows toward side surfaces 30B in cutout portions 31. The magnetic flux keeps fluid 27 within the region defined by magnetic pole 29A and side surfaces 30B. This results in the formation of holding portions 27B (trap portions) for fluid 27 as shown in FIG. 1.

It is preferable that holding portions 27B (trap portions) for fluid 27 should be coupled to holding portions 27A. This configuration prevents holding portions 27B from being separated from fluid 27 held in holding portions 27A. As a result, fluid 27 in holding portions 27A is less scattered.

The clearance between side surfaces 30A and the side surfaces of internal magnet 29 should be as small as possible, and it is further preferable that side surfaces 30A and the side surfaces of internal magnet 29 should be flush with each other. In this configuration, the distance between internal magnetic part 22A and the inner side surfaces of voice coil 26 can be small in cutout portions 31. This prevents holding portions 27B from being separated from fluid 27 in holding portions 27A.

It is preferable that the distance between side surfaces 30D and the inner side surfaces (side surfaces 230D) of voice coil 26 should be larger than the distance between side surfaces 30A and the inner side surfaces (side surfaces 230A) of voice coil 26. This configuration prevents the area of void parts 32 from being reduced by fluid 27. Void parts 32 are the clearances between side surfaces 30C of internal plate 30 and voice coil 26.

It is preferable that cutout portions 31 should include cutout portions 31$A_1$, 31$A_2$, 31$B_1$, and 31$B_2$ (FIGS. 1 and 4). Each of cutout portions 31$A_1$, 31$A_2$, 31$B_1$, and 31$B_2$ has side surfaces 30B (FIG. 4). Cutout portion 31$A_1$ and cutout portion 31$A_2$ are a pair of cutout portions 31A. Cutout portion 31$B_1$ and cutout portion 31$B_2$ are a pair of cutout portions 31B. Side surface 30$A_1$ is located between cutout portions 31$A_1$ and 31$B_1$. Side surface 30$A_2$ is located between cutout portions 31$A_2$ and 31$B_2$. Side surfaces 30C are a collective term of side surface $30C_1$ and side surface $30C_2$. Side surface $30D_1$ and side surface $30D_2$ may be collectively referred to as side surfaces 30D. Side surface $30C_1$ has side surface $30D_1$, side surfaces $30B_1$, and side surfaces $30B_2$. Side surface $30C_2$ has side surface $30D_2$, side surfaces $30B_1$, and side surfaces $30B_2$.

This configuration provides void part 32A between side surface $30C_1$ and the inner side surfaces (side surfaces 230D) of voice coil 26 (FIG. 1), and void part 32B between side surface $30C_2$ and the inner side surfaces (side surfaces 230D) of voice coil 26.

In other words, voice coil 26 includes side surface $230A_1$ (ninth side surface) substantially parallel to side surface $30A_1$ (third side surface) of internal plate 30 and side surface $230A_2$ (tenth side surface) substantially parallel to side surface $30A_2$ (fourth side surface). Voice coil 26 further includes side surface $230D_1$ (eleventh side surface) substantially parallel to side surface $30D_1$ (seventh side surface) of internal plate 30 and side surface $230D_2$ (twelfth side surface) substantially parallel to side surface $30D_2$ (eighth side surface). Void part 32A is located between side surface $30D_1$ of internal plate 30 and side surface $230D_1$ of voice coil 26. Void part 32B is located between side surface $30D_2$ of internal plate 30 and side surface $230D_2$ of voice coil 26.

In FIG. 1, cutout portions 31 are located at both ends of each of void parts 32A and 32B. This prevents fluid 27 from infiltrating void parts 32A and 32B, thereby reducing the decrease in the area of void parts 32A and 32B when viewed from above. In other words, this prevents the decrease in the area of the air passage, thereby reducing the increase in the speed of the air flowing through the passage. As a result, fluid 27 is less scattered.

Cutout portions 31 are not limited to two pairs, and may be any number of cutout portions. For example, internal plate 30 may include three or more pairs of cutout portions. It is preferable that these pairs of cutout portions 31 should be located 180 degrees rotationally symmetric about the center of internal plate 30 to make diaphragm 25 generate less rolling action.

It is preferable that loudspeaker 21 should have net 36 (FIG. 2) on its rear side. Net 36 can be applied to the rear side of bottom plate 28. In this case, bottom plate 28 has opening 37 for communication between the inside and outside of frame 24, and net 36 is applied to close opening 37. The mesh size of net 36 can be adjusted to make net 36 function as a filter and to make diaphragm 25 subjected to acoustic loads. This reduces the amplitude of diaphragm 25, and hence, the scattering of fluid 27. This also protects loudspeaker 21 from dust and dirt. Opening 37 may alternatively be provided on frame 24 instead of on bottom plate 28.

As shown in FIG. 4, it is preferable that magnetic circuit 22 should be substantially square-shaped because this enables loudspeaker 21 to be small enough to be stored in electronic apparatus. The following is a description of loudspeaker 21 including square-shaped magnetic circuit 22. Internal magnetic part 22A, external magnetic parts 22B, and voice coil 26 are substantially square-shaped when viewed from above. Internal magnet 29 and internal plate 30 are substantially square-shaped when viewed from above. In short, internal magnet 29 and internal plate 30 are substantially cubic-shaped. External magnets 34 and external plates 35 are substantially square-shaped when viewed from above. In short, external magnets 34 and external plates 35 are also substantially cubic-shaped.

Side surface $30A_1$ and side surface $30A_2$ are parallel and opposite to each other. External magnetic parts 22B include external magnetic part $22B_1$ and external magnetic part $22B_2$. In this case, internal magnetic part 22A is located between external magnetic parts $22B_1$ and $22B_2$. This configuration provides magnetic gaps 23A between side surface $30A_1$ and external magnetic part $22B_1$ and between side surface $30A_2$ and external magnetic part $22B_2$. This configuration also increases the area in which internal magnetic part 22A and external magnetic parts 22B face each other, thereby increasing the magnetic force supplied to voice coil 26. As a result, loudspeaker 21 has excellent sound pressure level characteristics.

It is preferable that external magnetic part $22B_1$ should include external magnet 34A and external plate 35A as shown in FIG. 3. It is also preferable that external magnetic part $22B_2$ should include external magnet 34B and external plate 35B. In this case, side surface $30A_1$ of internal plate 30 faces the side surface of external plate 35A, whereas side surface $30A_2$ of internal plate 30 faces the side surface of external plate 35B. Magnetic gaps 23A are located between side surface $30A_1$ and the side surface of external plate 35A and between side surface $30A_2$ and the side surface of external plate 35B. External magnets 34A and 34B are magnetically coupled in series with internal magnet 29 so as to increase the magnetic flux density in magnetic gaps 23A. As a result, loudspeaker 21 has more excellent sound pressure level characteristics.

It is preferable that cutout portions 31A should be located at the four corners of internal plate 30 (FIGS. 1 and 4). In this case, side surface $30D_1$ is located between cutout portions $31A_1$ and $31A_2$, whereas side surface $30D_2$ is located between cutout portions $31B_1$ and $31B_2$. This configuration reduces the infiltration of fluid 27 into the four corners of voice coil 26, and hence reduces the deposition of fluid 27 onto diaphragm 25 shown in FIG. 2, thereby reducing the decrease in the amount of fluid 27. In other words, this prevents fluid 27 that has reached the four corners of voice coil 26 from flowing into diaphragm 25 due to the capillary phenomenon.

Each of internal plate 30 and the internal magnet has long sides and short sides. The long sides of internal plate 30 and the long sides of internal magnet 29 are aligned in the same direction. In this case, side surfaces 30A are on the long sides, and side surfaces 30D are on the short sides. In this configuration, side surfaces 30A are larger in length than side surfaces 30D when internal plate 30 is viewed from above. This increases the magnetic flux density in magnetic gaps 23A, thereby reducing the scattering of fluid 27.

It is preferable that internal plate 30 and internal magnet 29 should be substantially equal in the length of the short sides. In this configuration, the long-side side surfaces of internal magnet 29 are aligned with side surfaces 30A of internal plate 30. It is also preferable that side surfaces 30A of internal plate 30 and the long-side side surfaces of internal magnet 29 should be aligned with each other. This configuration prevents holding portions 27B (trap portions) from being separated from fluid 27 held in holding portions 27A. This reduces the distance between magnetic pole 29A and voice coil 26 in cutout portions 31, so that fluid 27 in holding portions 27A can be attracted by the strong magnetic force of magnetic pole 29A. This further prevents holding portions 27B from being separated from fluid 27 held in holding portions 27A.

It is preferable that the four corners of internal magnet 29 should be chamfered when internal plate 30 is viewed from above. The chamfer angle can be, for example, 45 degrees (C-chamfered) to increase the area of the air passage and hence to decrease the speed of the air flowing through the passage. The clearances are large between the corners of internal magnet 29 and the inner side surfaces of voice coil 26, so that the air flows through the clearances at low speed. Since cutout portions 31 are located at the four corners of internal magnet 29, the four corners of internal magnet 29 are in the vicinity of the boundary between void parts 32 and holding portions 27A. This configuration reduces the speed of the air in the vicinity of the boundary between void parts 32 and holding portions 27A. As a result, the scattering of fluid 27 is further reduced. The chamfer angle at the four corners of internal magnet 29 is not limited to 45 degrees (C-chamfered) and may be round-chamfered (R-chamfered).

The following is a description of the various cutout portions. FIGS. 5A, 5B, 5C, and 5D are top views of internal magnetic parts 71, 73, 75, and 77, respectively, in the present exemplary embodiment. FIG. 5E is a perspective view of magnetic circuit 81 in the present exemplary embodiment. Magnetic circuit 81 includes internal magnetic part 71 in place of internal magnetic part 22A included in magnetic circuit 22 shown in FIG. 4.

Figure 5A:
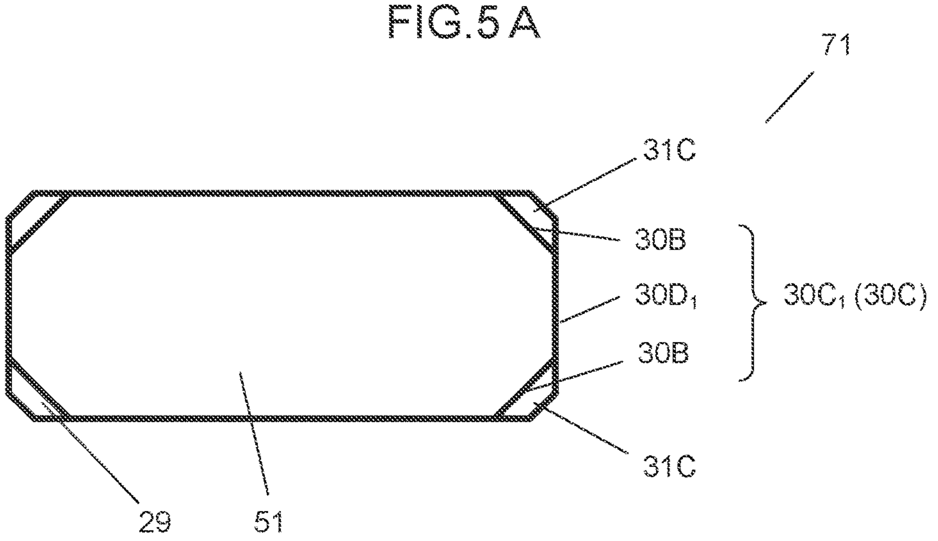
FIG. 5A is a top view of another internal magnetic part in the present exemplary embodiment.

FIG. 5A is a top view of internal magnetic part 71 includes internal plate 51 having cutout portions 31C at the corners. Internal plate 51 has cutout portions 31C in place of cutout portions 31 shown in FIG. 4. In short, cutout portions 31C are formed by chamfering the four corners of internal plate 51. Cutout portions 31C are formed by 45-degree chamfering the four corners of the internal plate, which is square-shaped when viewed from above. Cutout portions 31C may be round-chamfered (R-chamfered), instead of being chamfered at 45 degrees (C-chamfered).

Figure 5B:
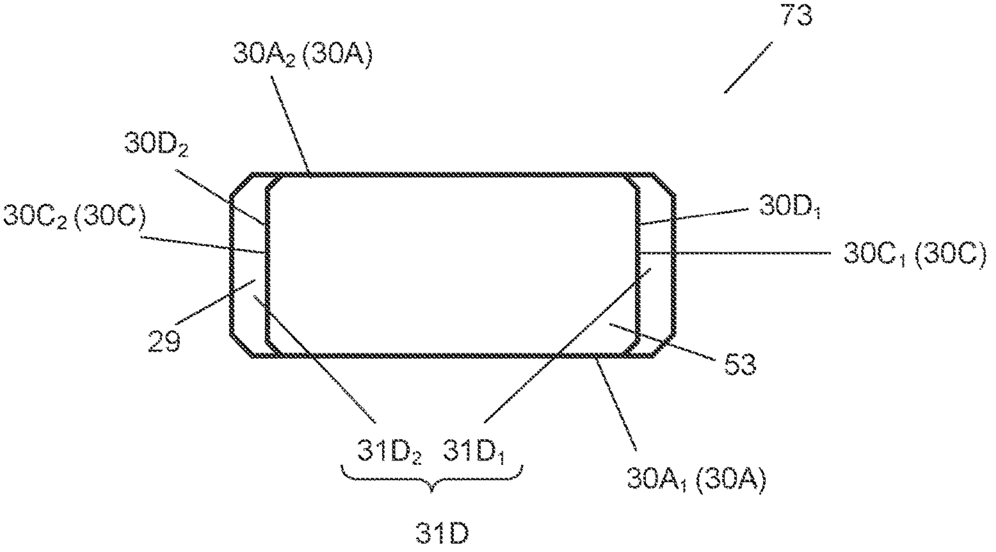
FIG. 5B is a top view of another internal magnetic part in the present exemplary embodiment.

FIG. 5B is a top view of internal magnetic part 73 includes internal plate 53 having cutout portions 31D. Internal plate 53 includes cutout portions 31D in place of cutout portions 31 shown in FIG. 4. Cutout portions 31D are a collective term of cutout portion 31$D_1$ and cutout portion 31$D_2$ located on facing two sides of internal plate 53. It is preferable that cutout portions 31D should be located on the short sides of internal plate 53. In other words, the distance between side surfaces 230D of voice coil 26 and side surfaces 30D of internal plate 30 is larger than the distance between side surfaces 230D of voice coil 26 and side surfaces 130D of internal magnet 29. This configuration provides a high magnetic flux density in magnetic gaps 23A. This configuration also makes the distance larger between side surfaces 30C of internal plate 53 and side surfaces 230D of voice coil 26 than between side surfaces 30A of internal plate 53 and side surfaces 230A of voice coil 26. This results in preventing the air passage from being narrowed by fluid 27.

Figure 5C:
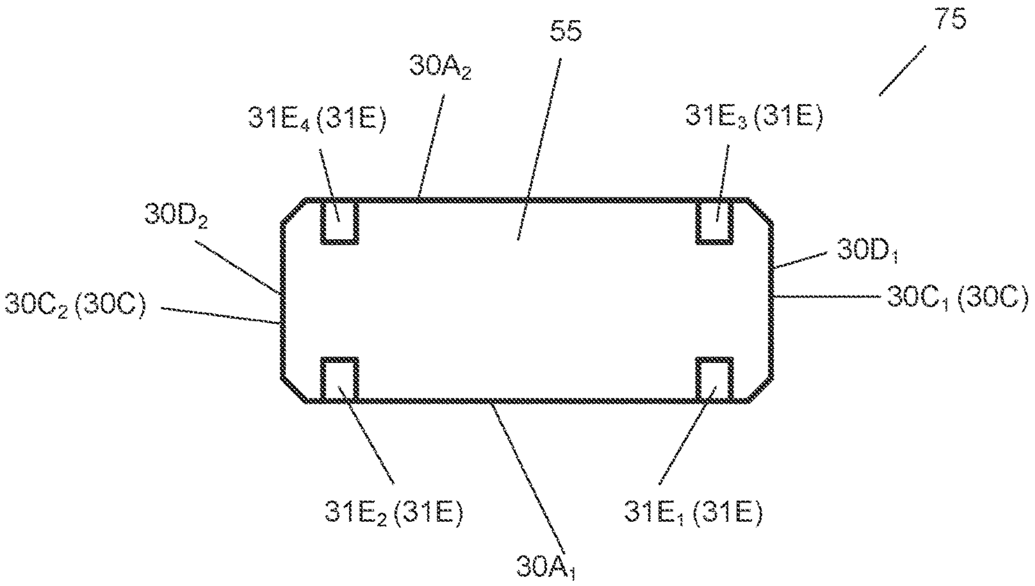
FIG. 5C is a top view of another internal magnetic part in the present exemplary embodiment.

FIG. 5C is a top view of internal magnetic part 75 includes internal plate 55 having cutout portions 31E. Internal plate 55 has cutout portions 31E in place of cutout portions 31A shown in FIG. 4. Cutout portions 31E, which are located at two positions on each long side of internal plate 55, are a collective term of cutout portion 31$E_1$, cutout portion 31$E_2$, cutout portion 31$E_3$, and cutout portion 31$E_4$. Side surface 30$A_1$ has cutout portions 31$E_1$ and 31$E_2$. Side surface 30$A_2$ has cutout portions 31$E_3$ and 31$E_4$. With this configuration, magnetic gaps 23A are located between external magnetic parts 22B and side surface 30$A_1$ excluding cutout portions 31$E_1$ and 31$E_2$ (i.e., the three portions of side surface 30$A_1$) and also between external magnetic parts 22B and side surface 30$A_2$ excluding cutout portions 31$E_3$ and 31$E_4$ (i.e., the three portions of side surface 30$A_2$). This increases the magnetic force in magnetic gaps 23A, and ensures the area of the air passage even when the short sides of internal plate 55 are short. As a result, internal magnet 29 has shorter short sides, enabling loudspeaker 21 to be small in size.

Figure 5D:
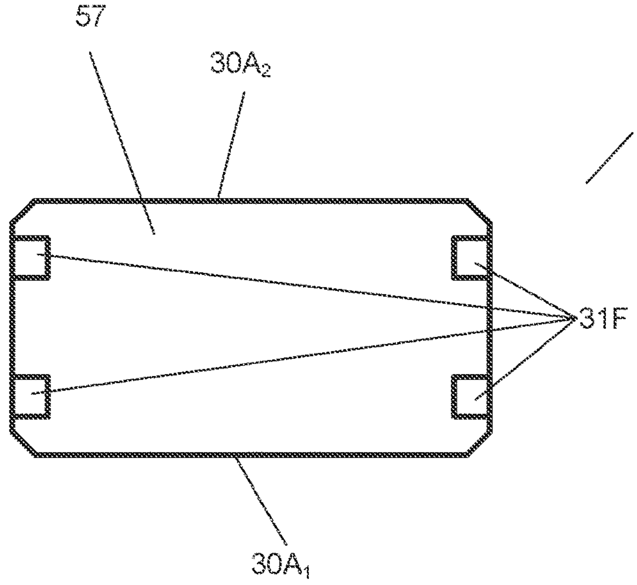
FIG. 5D is a top view of another internal magnetic part in the present exemplary embodiment.
Figure 5E:
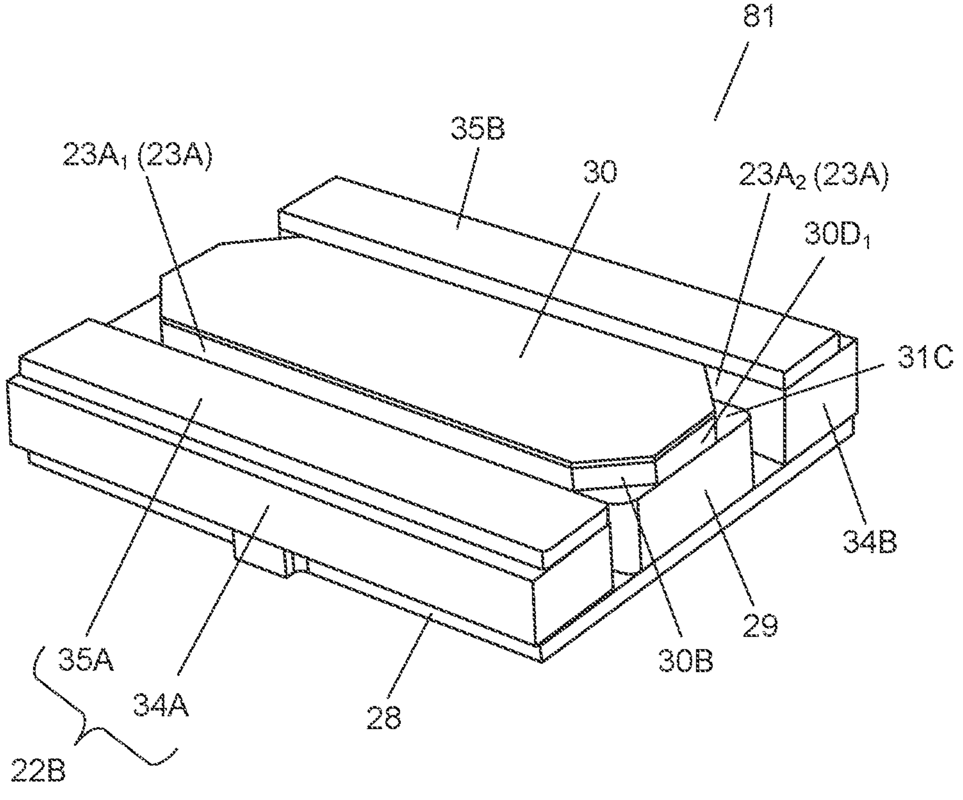
FIG. 5E is a perspective view of another magnetic circuit in the present exemplary embodiment.

FIG. 5D is a top view of internal magnetic part 77 includes internal plate 57 having cutout portions 31F. Internal plate 57 includes cutout portions 31F in place of cutout portions 31 shown in FIG. 4. Cutout portions 31F are located at two positions on each short side of internal plate 57. This configuration enables internal plate 57 to faces external magnetic parts 22B throughout the long sides of side surfaces 30A, thereby increasing the magnetic force in magnetic gaps 23A.

Figure 6:
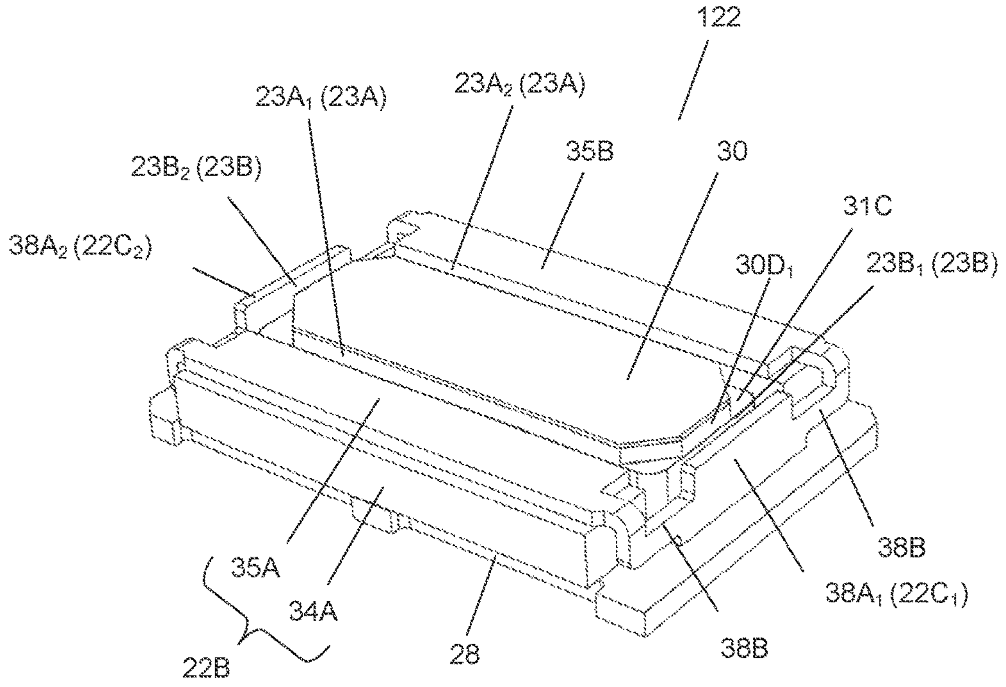
FIG. 6 is a perspective view of another magnetic circuit in the present exemplary embodiment.
Figure 7:
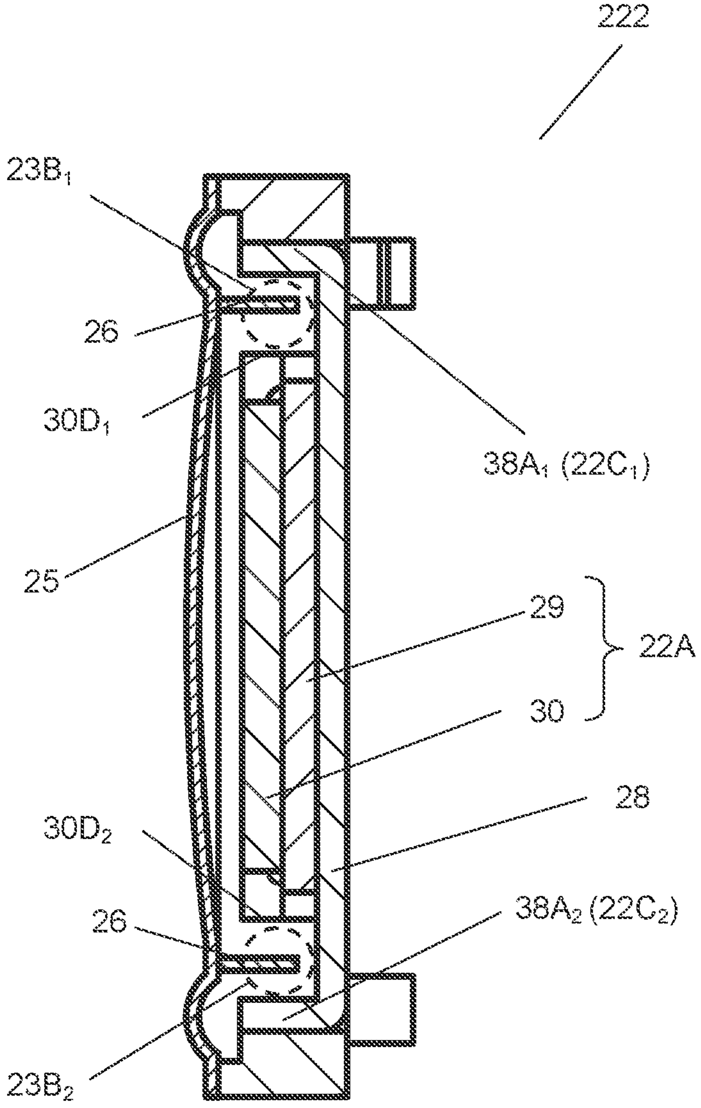
FIG. 7 is a sectional view of another loudspeaker, in accordance with the present exemplary embodiment, including another magnetic circuit.

FIG. 6 is a perspective view of magnetic circuit 122, and FIG. 7 is a sectional view of loudspeaker 222. Magnetic circuit 122 is a combination of magnetic circuit 81 shown in FIG. 5E and external magnetic parts 22C and joint 38B. The magnetic circuit of loudspeaker 222 is a combination of magnetic circuit 81 shown in FIG. 5E and external magnetic parts 22C. External magnetic parts 22C are identical to external plates 38A. External magnetic parts 22C are a collective term of external magnetic part 22$C_1$ and external magnetic part 22$C_2$. External plates 38A are a collective term of external plate 38$A_1$ and external plate 38$A_2$.

In magnetic circuit 122, external plates 38A are coupled to external plates 35A and 35B via joint 38B. In loudspeaker 222, external plates 38A are directly coupled to bottom plate 28.

Between internal plate 30 and external plates 38A, there are located magnetic gaps 23B, which are a collective term of magnetic gap 23$B_1$ and magnetic gap 23$B_2$.

External magnetic part 22$C_1$ (third external magnetic part) faces side surface 30$D_1$ with magnetic gap 23$B_1$ (third magnetic gap) located between them. External magnetic part 22$C_2$ (fourth external magnetic part) faces side surface 30$D_2$ with magnetic gap 23$B_2$ (fourth magnetic gap) located between them. Second end 26B of voice coil 26 shown in FIG. 2 is inserted in magnetic gaps 23A and magnetic gaps 23B.

In magnetic circuit 122, external plates 38A are preferably coupled to external plates 35A and 35B magnetically and mechanically, and may be coupled directly to these plates 35A and 35B without joint 38B. In this configuration, the magnetic flux is applied to voice coil 26 in magnetic gaps 23B in addition to magnetic gaps 23A. As a result, loudspeaker 21 has excellent sound pressure level characteristics.

It is preferable that joint 38B should be bent at the peripheral edges of external plates 35A and 35B toward bottom plate 28. Alternatively, the peripheral edges of external plates 35A and 35B may be bent toward bottom plate 28. It is also preferable that external plates 38A should be integrated with external plates 35A and 35B. This configuration reduces the number of components, thereby reducing the assembly man hours of magnetic circuit 122.

In loudspeaker 222, external plates 38A are bent at the outer peripheral edge of bottom plate 28 toward diaphragm 25. External plates 38A and bottom plate 28 may be integrated as shown in FIG. 7.

Figure 8:
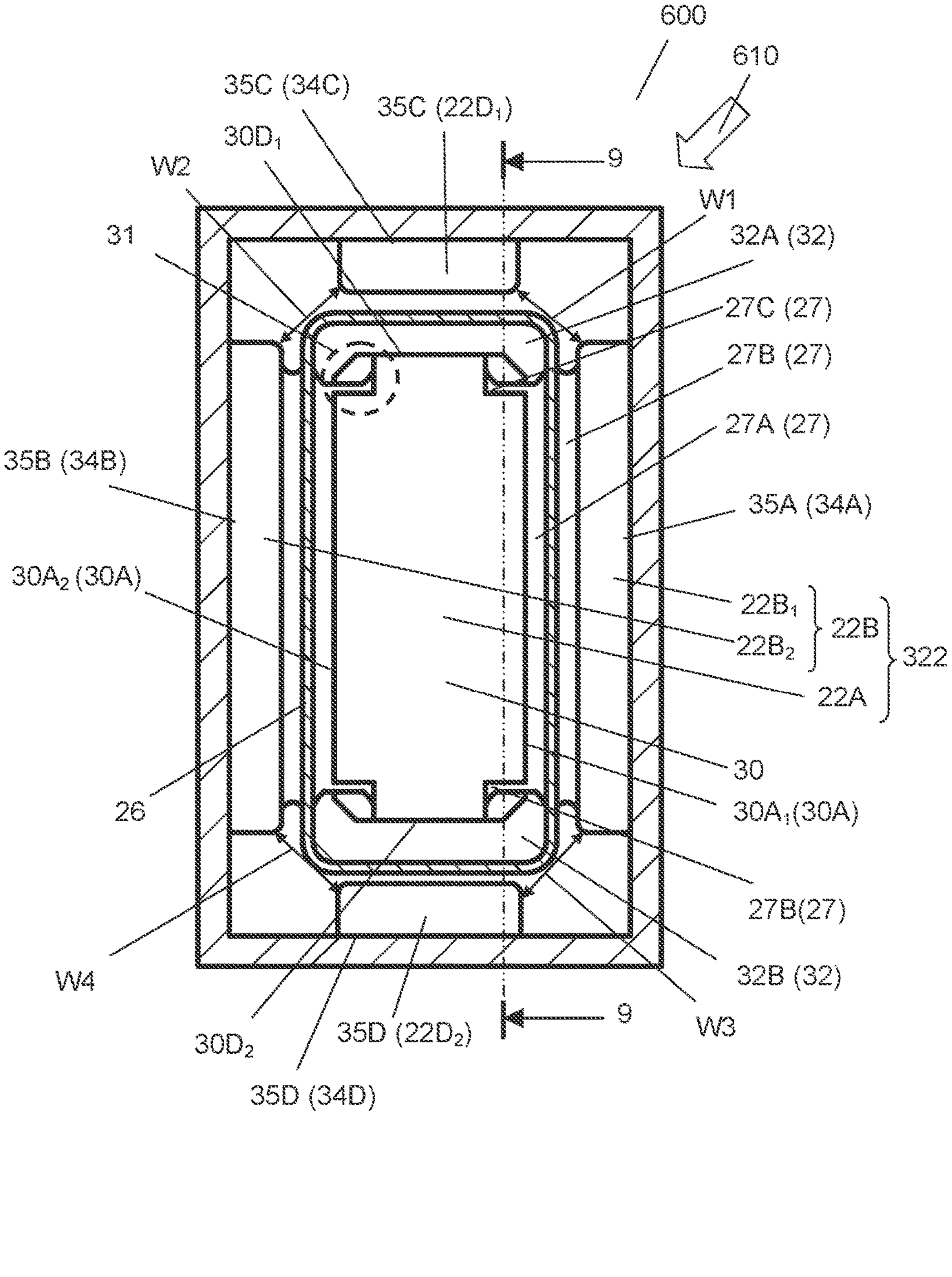
FIG. 8 is a top sectional view of another loudspeaker, in accordance with the present exemplary embodiment, including another magnetic circuit.
Figure 9:
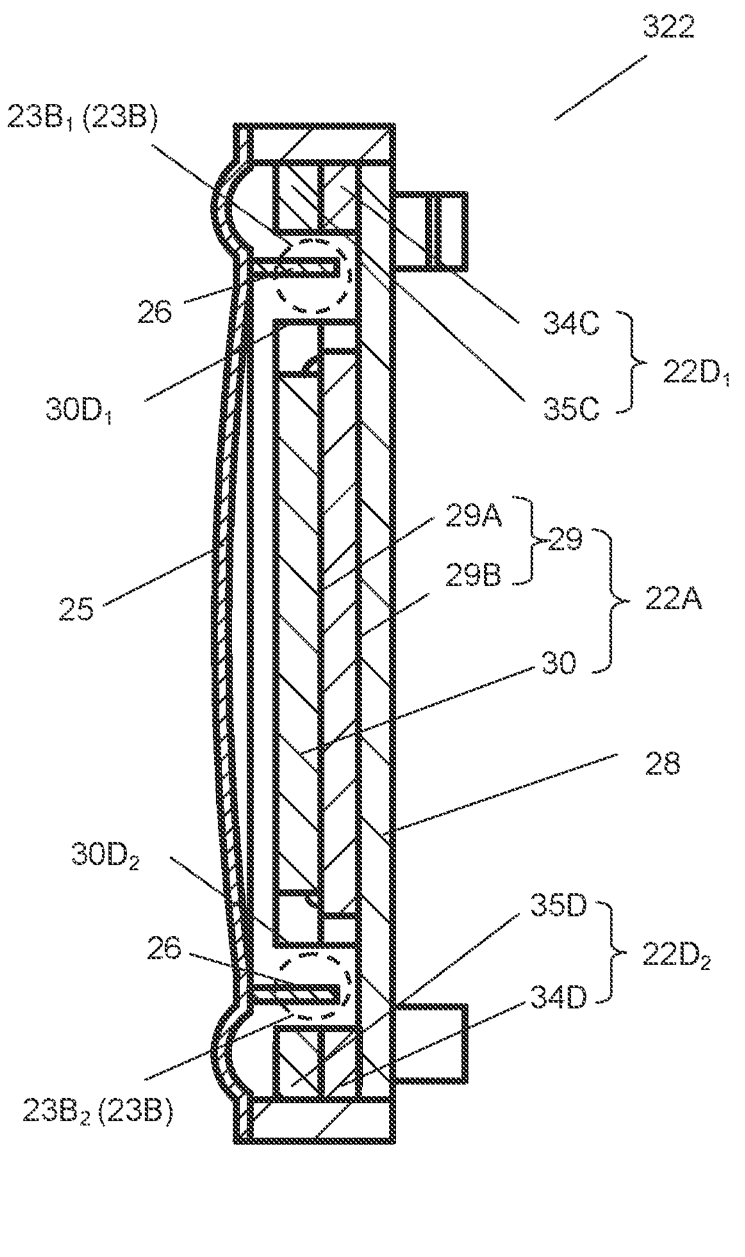
FIG. 9 is a sectional view taken along line 9-9 of FIG. 8.
Figure 10:
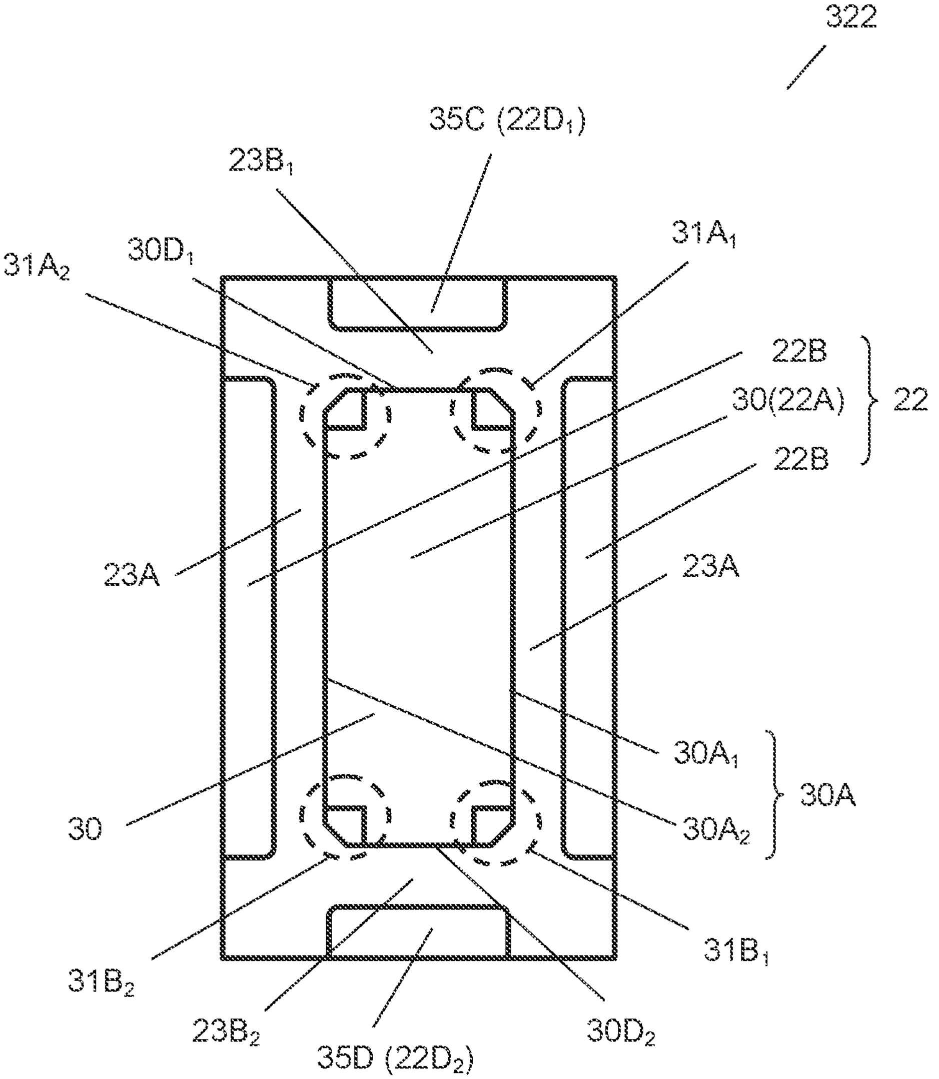
FIG. 10 is a top view of the another magnetic circuit in the present exemplary embodiment.

FIG. 8 is a top sectional view of loudspeaker 600 including magnetic circuit 322. FIG. 9 is a sectional view taken along line 9-9 of FIG. 8. FIG. 10 is a top view of magnetic circuit 322. Magnetic circuit 322 shown in FIG. 8 is a combination of magnetic circuit 22 shown in FIG. 4 and external magnetic parts 22D, which are a collective term of external magnetic part 22$D_1$ and external magnetic part 22$D_2$. External magnetic part 22$D_1$ faces side surface 30$D_1$ with magnetic gap 23$B_1$ located between them. External magnetic part $22D_2$ faces side surface $30D_2$ with magnetic gap $23B_2$ located between them.

External magnetic part $22D_1$ includes external magnet 34C (third external magnet) and external plate 35C. External magnetic part $22D_2$ includes external magnet 34D (fourth external magnet) and external plate 35D (FIG. 9).

The side surface of external plate 35C faces side surface $30D_1$, whereas the side surface of external plate 35D faces side surface $30D_2$. Magnetic gaps 23B are located between the side surface of external plate 35C and side surface $30D_1$ and between the side surface of external plate 35D and side surface $30D_2$. External magnet 34C is sandwiched between bottom plate 28 and external plate 35C, whereas external magnet 34D is sandwiched between bottom plate 28 and external plate 35D. External magnets 34C and 34D are magnetically coupled in series with internal magnet 29. In other words, external magnets 34C and 34D are coupled onto bottom plate 28. The magnetic poles of external magnets 34C and 34D are opposite to the magnetic pole of internal magnet 29.

In the above-described configuration, the magnetic fluxes of not only internal magnet 29 but also of external magnets 34C and 34D are applied to magnetic gaps 23B. This increases the amount of the magnetic flux in magnetic gaps 23B, so that loudspeaker 600 has a high sound-pressure level. Internal plate 30 has cutout portions 31, which prevent the area of void parts 32A and 32B from being decreased by fluid 27 even if the magnetic flux is large in magnetic gaps 23B. This reduces the scattering of fluid 27. It is preferable that external magnets 34C and 34D should be located distant from external magnets 34A and 34B. This configuration provides clearances between external magnets 34C and 34A, between external magnets 34C and 34B, between external magnets 34D and 34A, and between external magnets 34D and 34B. Voice coil 26 can be coupled to terminals 33 through these clearances.

Figure 11:
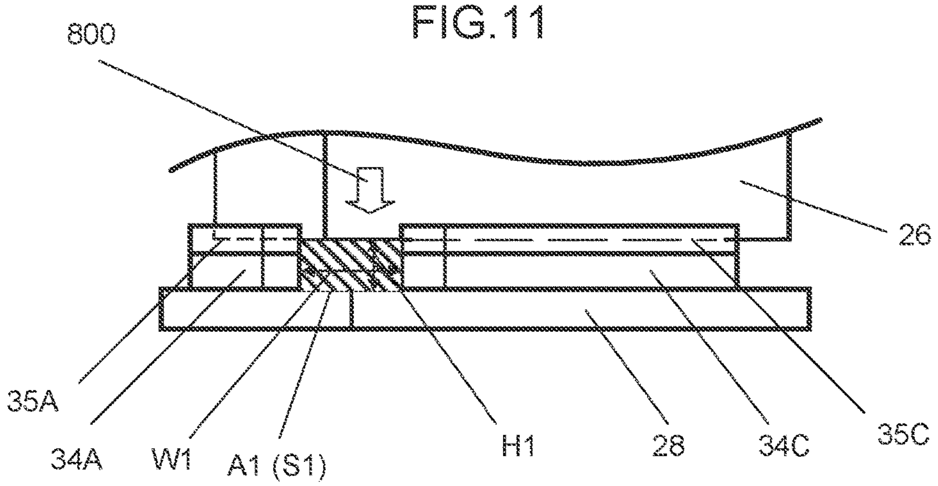
FIG. 11 is a partial schematic sectional view of the another loudspeaker, in accordance with the present exemplary embodiment, including the magnetic circuit.
Figure 12:
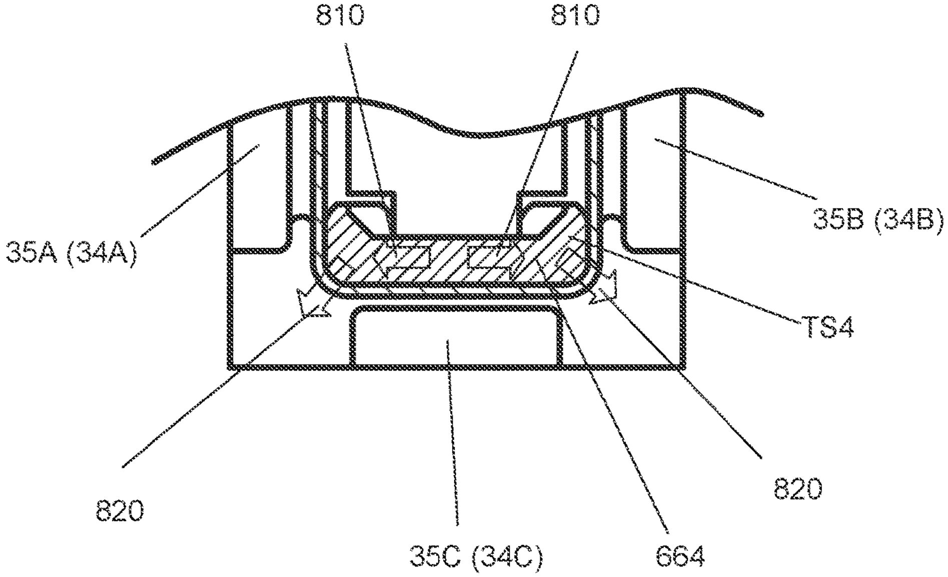
FIG. 12 is a partial top sectional view of the another loudspeaker, in accordance with the present exemplary embodiment, including the magnetic circuit.

The following is a description of airflow in loudspeaker 600. FIG. 11 is a partial schematic sectional view of loudspeaker 600 including magnetic circuit 322 when loudspeaker 600 of FIG. 8 is viewed in the direction of arrow 610. FIG. 12 is a partial top sectional view of loudspeaker 600 including magnetic circuit 322.

The minimum distance between external magnet 34A (first external magnet) and external magnet 34C (third external magnet) is referred to as a width W1 (first width). The minimum distance between bottom plate 28 and second end 26B of voice coil 26 is referred to as a height H1. There is an opening A1 (first opening) with the width W1 and the height H1. The product of the width W1 and the height H1 is referred to as an area S1 (first area). In short, the area S1 is the area of the opening A1. For easier understanding, the opening A1 (area S1) is hatched in FIG. 11.

The minimum distance between external magnet 34B (second external magnet) and external magnet 34C (third external magnet) is referred to as a width W2 (second width) as shown in FIG. 8. There is an opening A2 (second opening) with the width W2 and the height H1. The product of the width W2 and the height H1 is referred to as an area S2 (second area).

The minimum distance between external magnet 34A (first external magnet) and external magnet 34D (fourth external magnet) is referred to as a width W3 (third width) as shown in FIG. 8. There is an opening A3 (third opening) with the width W3 and the height H1. The product of the width W3 and the height H1 is referred to as an area S3 (third area).

The minimum distance between external magnet 34B (second external magnet) and external magnet 34D (fourth external magnet) is referred to as a width W4 (fourth width) as shown in FIG. 8. There is an opening A4 (fourth opening) with the width W4 and the height H1. The product of the width W4 and the height H1 is referred to as an area S4 (fourth area).

In FIGS. 11 and 12, the airflow is shown by arrows 800, 810, and 820. The air flows, for example, in the order of arrows 800, 810, and 820. Therefore, it is preferable that external magnets 34A, 34B, 34C, and 34D should be disposed distant from each other. The openings A1 to A4 together form an air passage, and air can flow in or out through the openings A1 to A4. The total of the areas S1, S2, S3, and S4 is referred to as a total area TS1 (first total area).

The total area of void parts 32 when viewed from the top surface of internal plate 30 is referred to as a total area TS2 (second total area). The area of regions in cutout portions 31 where internal magnet 29 is not covered with fluid 27 when viewed from the top surface of internal plate 30 is referred to as a total area TS3 (third total area).

The value obtained by subtracting the total area TS3 (third total area) from the total area TS2 (second total area) is referred to as a total area TS4 (fourth total area). In FIG. 12, part of the total area TS4 (fourth total area) is hatched. It is preferable that the total area TS1 (first total area) should be larger than the total area TS4 (fourth total area) because this configuration can reduce the scattering of fluid 27.

Figure 13:
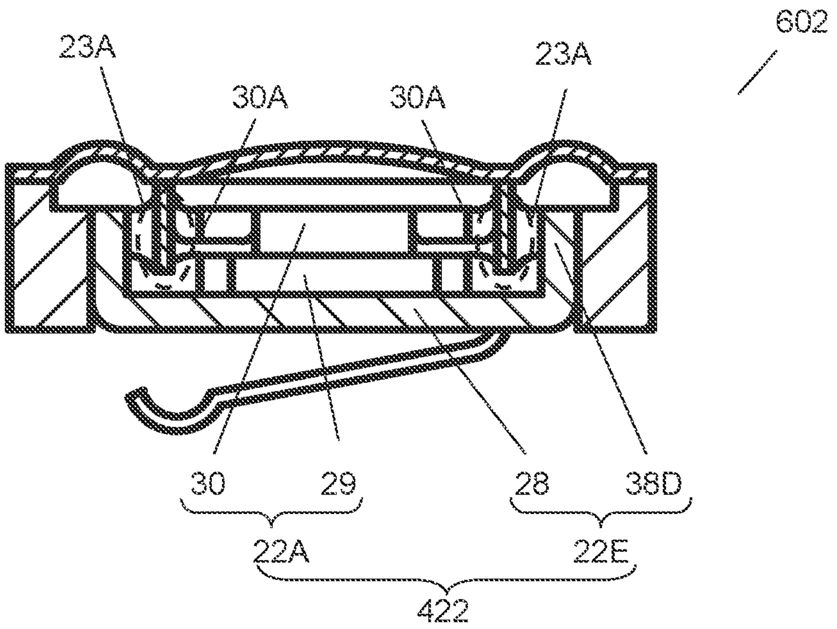
FIG. 13 is a sectional view of another loudspeaker, in accordance with the present exemplary embodiment, including another magnetic circuit.

FIG. 13 is a sectional view of loudspeaker 602 including magnetic circuit 422. Loudspeaker 602 includes magnetic circuit 422 in place of magnetic circuit 22 shown in FIG. 4. Magnetic circuit 422 includes external magnetic parts 38D in place of external magnetic parts 22B shown in FIG. 4. External magnetic parts 38D may be directly coupled or integrated with bottom plate 28. In other words, external magnetic parts 38D are bent at the outer peripheral edge of bottom plate 28 toward diaphragm 25. Magnetic gaps 23A are located between side surfaces 30A and external magnetic parts 38D.

Figure 14A:
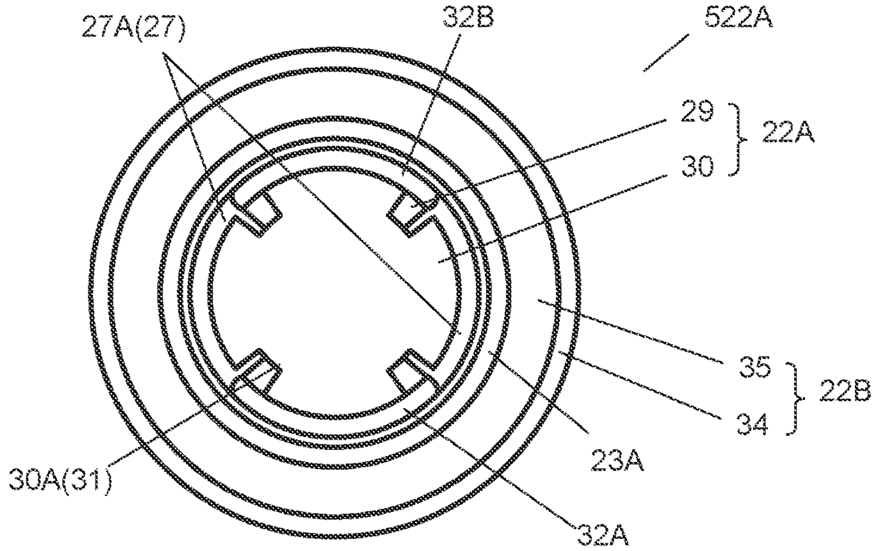
FIG. 14A is a top view of a circular magnetic circuit in the present exemplary embodiment.
Figure 14B:
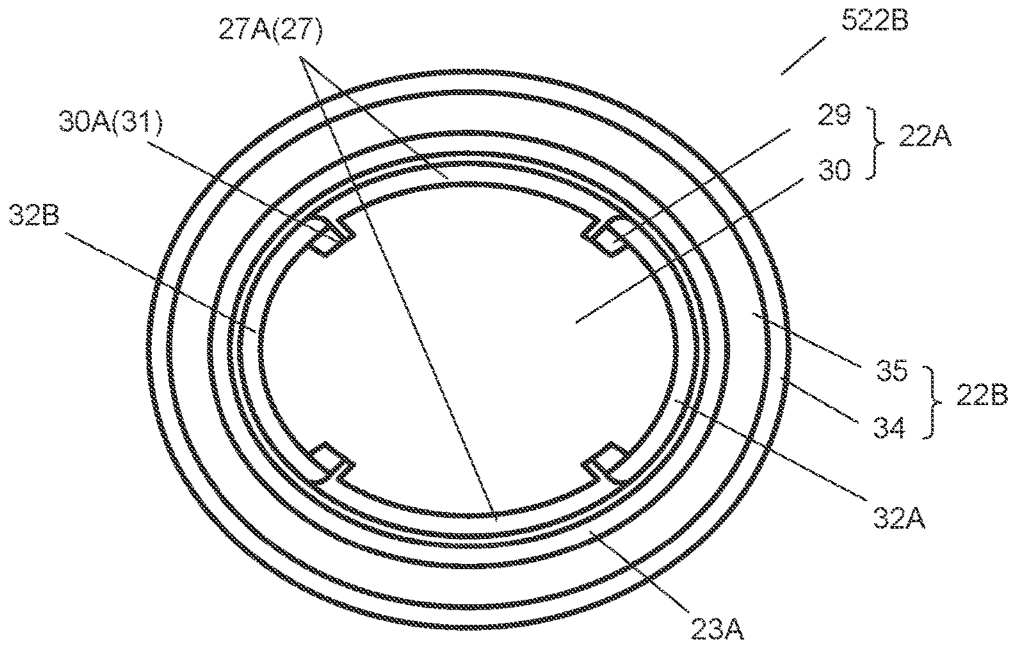
FIG. 14B is a top view of an oval magnetic circuit in the present exemplary embodiment.
Figure 14C:
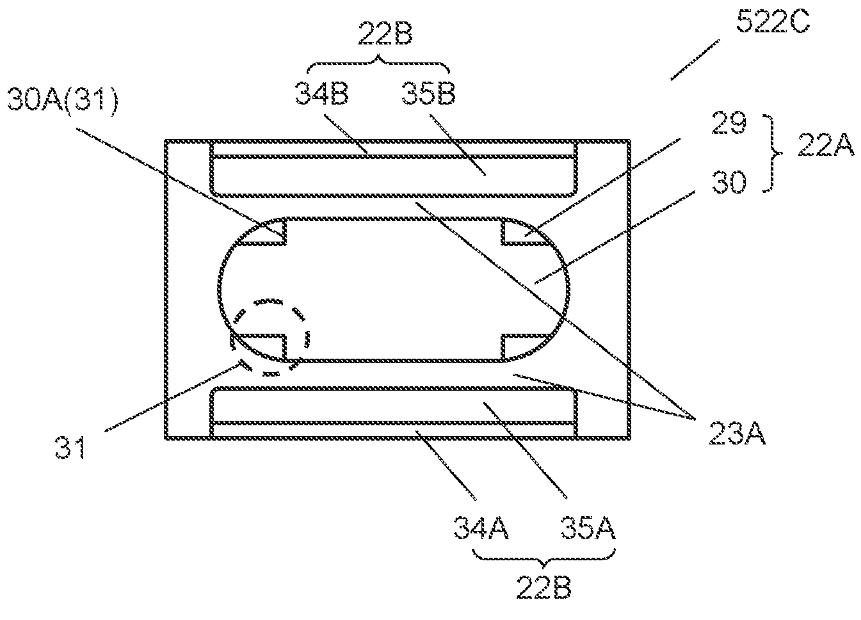
FIG. 14C is a top view of a magnetic circuit including a rounded-rectangular internal magnet in the present exemplary embodiment.

The following is a description of a loudspeaker including a non-square-shaped internal magnet. FIG. 14A is a top view of circular magnetic circuit 522A. FIG. 14B is a top view of oval magnetic circuit 522B. FIG. 14C is a top view of magnetic circuit 522C including a rounded-rectangular internal magnet 29. As shown in FIGS. 14A to 14C, the internal magnet may be circular, non-circular, or other shapes when viewed from above. In other words, the internal magnet, which is substantially square-shaped in loudspeaker 21 of FIG. 1, may alternatively be circular, oval, or of any other shape. Loudspeaker 21 includes two external magnetic parts in FIG. 1, but may alternatively include one external magnetic part as shown in FIGS. 14A and 14B. The number of the external magnetic parts is not particularly limited.

In circular magnetic circuit 22, internal magnetic part 22A is circular when viewed from above as shown in FIG. 14A. As a result, internal magnet 29 is circular, and internal plate 30 is substantially circular when viewed from above. Meanwhile, external magnetic parts 22B and voice coil 26 are ring-shaped when viewed from above. In other words, external plates 35 and external magnets 34 have a circular hole in the center.

In oval magnetic circuit 522B, internal magnetic part 22A is oval when viewed from above as shown in FIG. 14B. As a result, internal magnet 29 is oval, and internal plate 30 is substantially oval when viewed from above. Meanwhile, external magnetic parts 22B and voice coil 26 are oval ring-shaped when viewed from above. In other words, external plates 35 and external magnets 34 have an oval hole in the center.

In FIGS. 14A and 14B, external magnetic parts 22B (including the first external magnetic part) surround internal plate 30 with magnetic gaps 23A (including the first magnetic gap) located between them. Internal magnet 29 is either circular or oval when viewed from the top surface of internal plate 30. Cutout portions 31 are located at regular intervals around internal plate 30 above internal magnet 29.

In magnetic circuit 522C including rounded-rectangular internal magnet 29 as shown in FIG. 14C, internal magnetic part 22A and voice coil 26 are rounded-rectangular-shaped when viewed from above. Internal plate 30 is substantially rounded-rectangular-shaped. Cutout portions 31 are located above the boundary between the straight-line and curved-line segments of the rounded rectangle.

Internal magnet 29 may be circular or substantially square-shaped instead of being rounded-rectangular-shaped when viewed from above. It is, however, preferable that external magnetic parts 22B should be substantially square-shaped. In this case, external plates 35 and external magnets 34 are substantially square-shaped when viewed from above.

External magnetic parts 22B may be not substantially square-shaped, but rounded-rectangular-shaped. In this case, external plates 35 and external magnets 34 may have a rounded-rectangular hole in the center when viewed from above. The center hole may be not rounded-rectangular but substantially square-shaped. In this case, it is preferable that external magnets 34 should be formed of a plurality of magnets.

Figure 15:
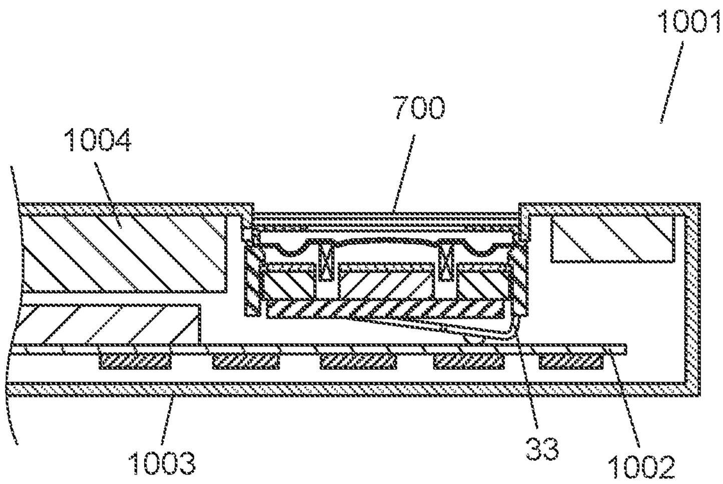
FIG. 15 is a sectional view of a main part of an electronic apparatus in accordance with the present exemplary embodiment.

Electronic apparatus 1001 mounted with loudspeaker 700 will now be described with reference to drawings. Loudspeaker 700 is one of loudspeakers 21, 222, 600, and 602. FIG. 15 is a sectional view of a main part of electronic apparatus 1001, which is a mobile device such as a mobile telephone or a smartphone. Examples of electronic apparatus 1001 further include portable game consoles, mobile devices like portable navigation devices, video devices like TVs, and personal computers. Thus, apparatus 1001 in which loudspeaker 700 is mounted can be used in various applications to generate sounds.

Electronic apparatus 1001 includes loudspeaker 700 and amplifier 1002, which supplies loudspeaker 700 with electrical signals. Apparatus 1001 preferably includes cabinet 1003, and can further include display unit 1004. In this configuration, loudspeaker 700, amplifier 1002, and display unit 1004 are stored in cabinet 1003. One example of display unit 1004 is a liquid crystal display device. When electrically coupled to terminals 33, amplifier 1002 supplies electrical signals to loudspeaker 700.

Loudspeaker 700 is mounted in electronic apparatus 1001. Therefore, the scattering of fluid 27 can be avoided even when apparatus 1001 is accidentally dropped or subjected to a strong impact. As a result, loudspeaker 700 maintains its characteristics and hence its sound quality.

Figure 16:
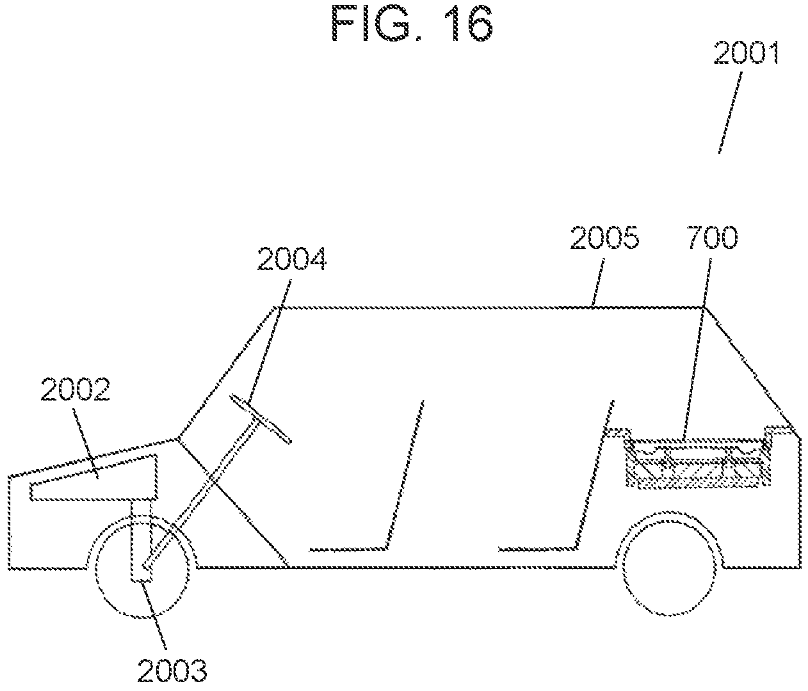
FIG. 16 is a conceptual view of a mobile body device in accordance with the present exemplary embodiment.

Next, mobile body device 2001 mounted with loudspeaker 700 will be described with reference to drawings. FIG. 16 is a conceptual view of an automobile, which is an example of mobile body device 2001. Examples of device 2001 include motorcycles, buses, electric trains, and marine vessels besides automobiles. Mobile body device 2001 includes power generation unit 2002, drive unit 2003, steering unit 2004, body 2005, and loudspeaker 700. Units 2002, 2003, and 2004, and loudspeaker 700 are mounted in body 2005. Power generation unit 2002 generates power to move mobile body device 2001. Unit 2002 can be, for example, an engine, but may alternatively be a motor or include a motor.

Drive unit 2003 receives the power generated by power generation unit 2002 and moves body 2005. In the case that device 2001 is an automobile, drive unit 2003 includes, for example, tires. Steering unit 2004 is coupled with drive unit 2003 to change the travelling direction of body 2005. Steering unit 2004 can be, for example, a steering wheel.

In the case that device 2001 is an automobile, loudspeaker 700 may be integrated into the front panel or the rear tray of the body, or may alternatively be mounted in body 2005 as part of a car navigation system or a car audio system. Loudspeaker 700 is not necessarily mounted directly in body 2005 as a component of the mobile body device, and can be mounted in electronic apparatus 1001 shown in FIG. 15, which is mounted in mobile body device 2001.

According to the above-described configuration, the scattering of fluid 27 is avoided even when mobile body device 2001 is subjected to vibration during transport or to impact due to collision with another mobile body device.

As described above, according to the present disclosure, the cutout portions are located on the boundary between the voids and the holding portions. The internal plate is located inside the outer peripheral edge of the internal magnet when viewed from above. In this configuration, the magnetic force of the internal magnet in the cutout portions keeps the magnetic fluid attracted in the cutout portions. As a result, even if the loudspeaker is subjected to an impact force, the magnetic fluid is held in place by the magnetic force of the internal magnet. Furthermore, the magnetic fluid is prevented from infiltrating the voids, so that the voids are prevented from being clogged with the fluid. This reduces the scattering of the fluid.

INDUSTRIAL APPLICABILITY

The loudspeaker in accordance with the present disclosure, which restricts the scattering of the magnetic fluid, is useful in small portable electronic apparatuses such as mobile telephones and smartphones.

REFERENCE MARKS IN THE DRAWINGS

21 loudspeaker
22 magnetic circuit
22A internal magnetic part
22B external magnetic part
22$B_1$ external magnetic part (first external magnetic part)
22$B_2$ external magnetic part (second external magnetic part)
22C external magnetic part
22$C_1$ external magnetic part (third external magnetic part)
22$C_2$ external magnetic part (fourth external magnetic part)
22D external magnetic part
22$D_1$ external magnetic part
22$D_2$ external magnetic part
23A magnetic gap
23$A_1$ magnetic gap (first magnetic gap)
23$A_2$ magnetic gap (second magnetic gap)
23B magnetic gap
23$B_1$ magnetic gap (third magnetic gap)
23$B_2$ magnetic gap (fourth magnetic gap)
24 frame
25 diaphragm
26 voice coil
26A first end

26B second end
27 magnetic fluid
27A holding portion
27B holding portion (trap portion)
27C holding portion
28 bottom plate
29 internal magnet
29A magnetic pole
29B magnetic pole
30 internal plate
30A side surface
30$A_1$ side surface (third side surface)
30$A_2$ side surface (fourth side surface)
30B side surface
30$B_1$ side surface
30$B_2$ side surface
30C side surface
30$C_1$ side surface
30$C_2$ side surface
30D side surface
30$D_1$ side surface (seventh side surface)
30$D_2$ side surface (eighth side surface)
31 cutout portion
31A cutout portion
31$A_1$ cutout portion
31$A_2$ cutout portion
31B cutout portion
31$B_1$ cutout portion
31$B_2$ cutout portion
31C cutout portion
31D cutout portion
31$D_2$ cutout portion
31$D_1$ cutout portion
31E cutout portion
31$E_1$ cutout portion
31$E_2$ cutout portion
31$E_3$ cutout portion
31$E_4$ cutout portion
32 void
31F cutout portion
32A void
32B void
33 terminal
34 external magnet
34A external magnet
34B external magnet
34C external magnet
34D external magnet
35 external plate
35A external plate
35B external plate
35C external plate
35D external plate
36 net
37 opening
38A external plate
38$A_1$ external plate
38$A_2$ external plate
38B joint
38D external magnetic part
51 internal plate
53 internal plate
55 internal plate
57 internal plate
60 top surface
61 bottom surface
71 internal magnetic part
73 internal magnetic part
75 internal magnetic part
77 internal magnetic part
81 magnetic circuit
122 magnetic circuit
130A side surface
130$A_1$ side surface (first side surface)
130$A_2$ side surface (second side surface)
130D side surface
130$D_1$ side surface (fifth side surface)
130$D_2$ side surface (sixth side surface)
222 loudspeaker
230A side surface
230$A_1$ side surface (ninth side surface)
230$A_2$ side surface (tenth side surface)
230D side surface
230$D_1$ side surface (eleventh side surface)
230$D_2$ side surface (twelfth side surface)
322 magnetic circuit
422 magnetic circuit
522B magnetic circuit
522C magnetic circuit
522A magnetic circuit
1001 electronic apparatus
1002 amplifier
1003 cabinet
1004 display unit
2001 mobile body device
2002 power generation unit
2003 drive unit
2004 steering unit
2005 body
600 loudspeaker
610 arrow
602 loudspeaker
700 loudspeaker
800, 810, 820 arrow

The invention claimed is:

1. A loudspeaker comprising:

a bottom plate;

an internal magnet having a first surface coupled to the bottom plate;

an internal plate coupled to a second surface of the internal magnet on a reverse side from the first surface;

a first external magnetic part arranged to the internal plate with a first magnetic gap located therebetween, and coupled to the bottom plate;

a frame coupled to at least one of the bottom plate and the first external magnetic part;

a diaphragm having an outer peripheral edge supported by the frame; and a cylindrical voice coil having a first end and a second end opposite to the first end, the first end being coupled to the diaphragm and the second end being inserted in the first magnetic gap, wherein the internal plate includes a cutout portion where the internal plate has an outer periphery smaller than an outer periphery of the internal magnet when the cutout portion is viewed from a top surface of the internal plate, a holding portion holding magnetic fluid and a void part having a void are placed between the voice coil and the internal plate, the holding portion and the void part being adjacent to each other, and in the cutout portion, the magnetic fluid overlaps the internal magnet in a thickness direction of the loudspeaker.

2. The loudspeaker according to claim 1, wherein the first external magnetic part surrounds the internal plate with the first magnetic gap located therebetween.

3. The loudspeaker according to claim 1, wherein the magnetic fluid has a saturation magnetic flux density in a range of 20 mT to 200 mT, inclusive.

4. An electronic apparatus comprising:

the loudspeaker according to claim 1; and an amplifier configured to supply an electrical signal to the loudspeaker.

5. A device comprising:

a body;

a power generating device mounted in the body;

a drive device coupled to the power generator;

a steering device coupled to the drive device; and the loudspeaker according to claim 1 mounted in the body.

6. The loudspeaker according to claim 1, further comprising a second external magnetic part opposite to the first external magnetic part of the internal plate with a second magnetic gap located therebetween, the second external magnetic part having a first surface coupled to the bottom plate, wherein the second end of the voice coil is inserted in the first magnetic gap and the second magnetic gap.

7. The loudspeaker according to claim 6, wherein the first external magnetic part includes a first external magnet and a first external plate, the second external magnetic part includes a second external magnet and a second external plate, the first external magnet and the second external magnet are coupled to the bottom plate, and the internal magnet is magnetized in an opposite direction to the first external magnet and the second external magnet.

8. The loudspeaker according to claim 6, wherein the internal magnet has a first side surface and a second side surface opposite to and substantially parallel to the first side surface, the internal plate has a third side surface substantially parallel to the first side surface and a fourth side surface substantially parallel to the second side surface, the first external magnetic part faces the third side surface with the first magnetic gap located therebetween, and the second external magnetic part faces the fourth side surface with the second magnetic gap located therebetween.

9. The loudspeaker according to claim 8, wherein the cutout portion is one of a plurality of cutout portions, and the plurality of cutout portions are rotationally symmetric about a center of the internal plate when viewed from the top surface of the internal plate.

10. The loudspeaker according to claim 8, wherein the cutout portion is square-shaped when viewed from the top surface of the internal plate.

11. The loudspeaker according to claim 8, wherein the internal magnet has a fifth side surface substantially perpendicular to the first side surface of the internal magnet and a sixth side surface opposite to and substantially parallel to the fifth side surface, and the internal plate has a seventh side surface substantially parallel to the fifth side surface and an eighth side surface substantially parallel to the sixth side surface.

12. The loudspeaker according to claim 11, wherein the cutout portion is located on the third side surface and the fourth side surface of the internal plate.

13. The loudspeaker according to claim 11, wherein the cutout portion is located on the seventh side surface and the eighth side surface of the internal plate.

14. The loudspeaker according to claim 11, wherein the cutout portion is located in at least one of following regions of the internal plate:

between the third side surface and the seventh side surface, between the third side surface and the eighth side surface, between the fourth side surface and the seventh side surface, and between the fourth side surface and the eighth side surface.

15. The loudspeaker according to claim 11, wherein the internal magnet is substantially square-shaped when viewed from the top surface of the internal plate, and the cutout portion is located above four corners of the internal magnet.

16. The loudspeaker according to claim 11, wherein the internal plate is substantially square-shaped when viewed from the top surface of the internal plate, and the cutout portion is located at four corners of the internal plate.

17. The loudspeaker according to claim 11, wherein the internal magnet has 45-degree chamfered four corners when viewed from the top surface of the internal plate.

18. The loudspeaker according to claim 11, wherein the voice coil has following side surfaces:

a ninth side surface substantially parallel to the third side surface of the internal plate;

a tenth side surface substantially parallel to the fourth side surface of the internal plate;

an eleventh side surface substantially parallel to the seventh side surface of the internal plate; and a twelfth side surface substantially parallel to the eighth side surface of the internal plate, and the void part is located between the seventh side surface and the eleventh side surface and between the eighth side surface and the twelfth side surface.

19. The loudspeaker according to claim 18, wherein when viewed from the top surface of the internal plate, a distance between the eleventh side surface and the seventh side surface is larger than a distance between the eleventh side surface and the fifth side surface, and a distance between the twelfth side surface and the eighth side surface is larger than a distance between the twelfth side surface and the sixth side surface.

20. The loudspeaker according to claim 18, wherein when viewed from the top surface of the internal plate, a distance between the ninth side surface and the third side surface is larger than a distance between the ninth side surface and the first side surface, and a distance between the seventh side surface and the eleventh side surface, and a distance between the eighth side surface and the twelfth side surface are larger than a distance between the third side surface and the ninth side surface and a distance between the fourth side surface and the tenth side surface.

21. The loudspeaker according to claim 11, further comprising:

a third external magnetic part facing the seventh side surface of the internal plate with a third magnetic gap located therebetween, and a fourth external magnetic part facing the eighth side surface of the internal plate with a fourth magnetic gap located therebetween, wherein the second end of the voice coil is inserted in the first magnetic gap, the second magnetic gap, the third magnetic gap, and the fourth magnetic gap.

22. The loudspeaker according to claim 21, wherein the third external magnetic part includes a third external magnet and a third external plate, the fourth external magnetic part includes a fourth external magnet and a fourth external plate, the third external magnet and the fourth external magnet are coupled to the bottom plate, and the internal magnet is magnetized in an opposite direction to the third external magnet and the fourth external magnet.

23. The loudspeaker according to claim 22, wherein defining that a minimum distance between the first external magnet and the third external magnet is a first width, a minimum distance between the second external magnet and the third external magnet is a second width, a minimum distance between the first external magnet and the fourth external magnet is a third width, a minimum distance between the second external magnet and the fourth external magnet is a fourth width, a minimum distance between the bottom plate and the second end of the voice coil is a height, a product of the first width and the height is a first area, a product of the second width and the height is a second area, a product of the third width and the height is a third area, a product of the fourth width and the height is a fourth area, a total of the first area, the second area, the third area, and the fourth area is a first total area, a total area of the void part when viewed from the top surface of the internal plate is a second total area, an area of a region, of the cutout portion, in which the internal magnet is not covered with the magnetic fluid is a third total area when viewed from the top surface of the internal plate, a value obtained by subtracting the third total area from the second total area is a fourth total area, the first total area is larger than the fourth total area.

* * * * *